(12) United States Patent
Kaiser et al.

(10) Patent No.: US 12,120,197 B2
(45) Date of Patent: Oct. 15, 2024

(54) SYSTEM AND METHOD FOR REMEMBERING A THOUGHT

(71) Applicant: Erik A. Kaiser, New York, NY (US)

(72) Inventors: Erik A. Kaiser, New York, NY (US); Joshua David Kran, Endwell, NY (US)

(73) Assignee: Erik Kaiser, New York, NY (US)

( * ) Notice: Subject to any disclaimer, the term of this patent is extended or adjusted under 35 U.S.C. 154(b) by 0 days.

(21) Appl. No.: 18/119,148

(22) Filed: Mar. 8, 2023

(65) Prior Publication Data

US 2023/0291810 A1    Sep. 14, 2023

Related U.S. Application Data

(60) Provisional application No. 63/318,297, filed on Mar. 9, 2022.

(51) Int. Cl.
*G10L 15/16*    (2006.01)
*G10L 15/26*    (2006.01)
*H04L 67/565*   (2022.01)

(52) U.S. Cl.
CPC ............ *H04L 67/565* (2022.05); *G10L 15/26* (2013.01)

(58) Field of Classification Search
CPC ........ G10L 15/26; H04L 67/565; H04L 67/06
See application file for complete search history.

(56) References Cited

U.S. PATENT DOCUMENTS

| | | | |
|---|---|---|---|
| 7,103,154 B1* | 9/2006 | Cannon | H04M 3/533 379/88.16 |
| 11,404,049 B2* | 8/2022 | Nguyen | G10L 15/16 |
| 2016/0118044 A1* | 4/2016 | Bondarev | G10L 15/26 704/235 |

* cited by examiner

*Primary Examiner* — Cheikh T Ndiaye
(74) *Attorney, Agent, or Firm* — Steven N. Fox, Esq.

(57) ABSTRACT

Disclosed is a method for remembering a thought by a person and sending the thought to a recipient having a Communication Device. In one embodiment, the method comprises the steps of: (1) providing a Communication Device in control by the person; (2) providing a Recording and Transmitting Device in control by the person; (3) recording an audio thought by the person on the Recording and Transmitting Device to create an audio thought file; (4) sending the audio thought file from the Recording and Transmitting Device to the Communication Device; (5) transcribing the audio thought file on the Communication Device to create a transcribed audio thought file; (6) checking the transcribed audio thought file against a set of rules on the Communication Device; and (7) sending the transcribed thought file from the Communication Device to the Communication Device of the Recipient according to the set of rules.

17 Claims, 19 Drawing Sheets

Architectural Overview

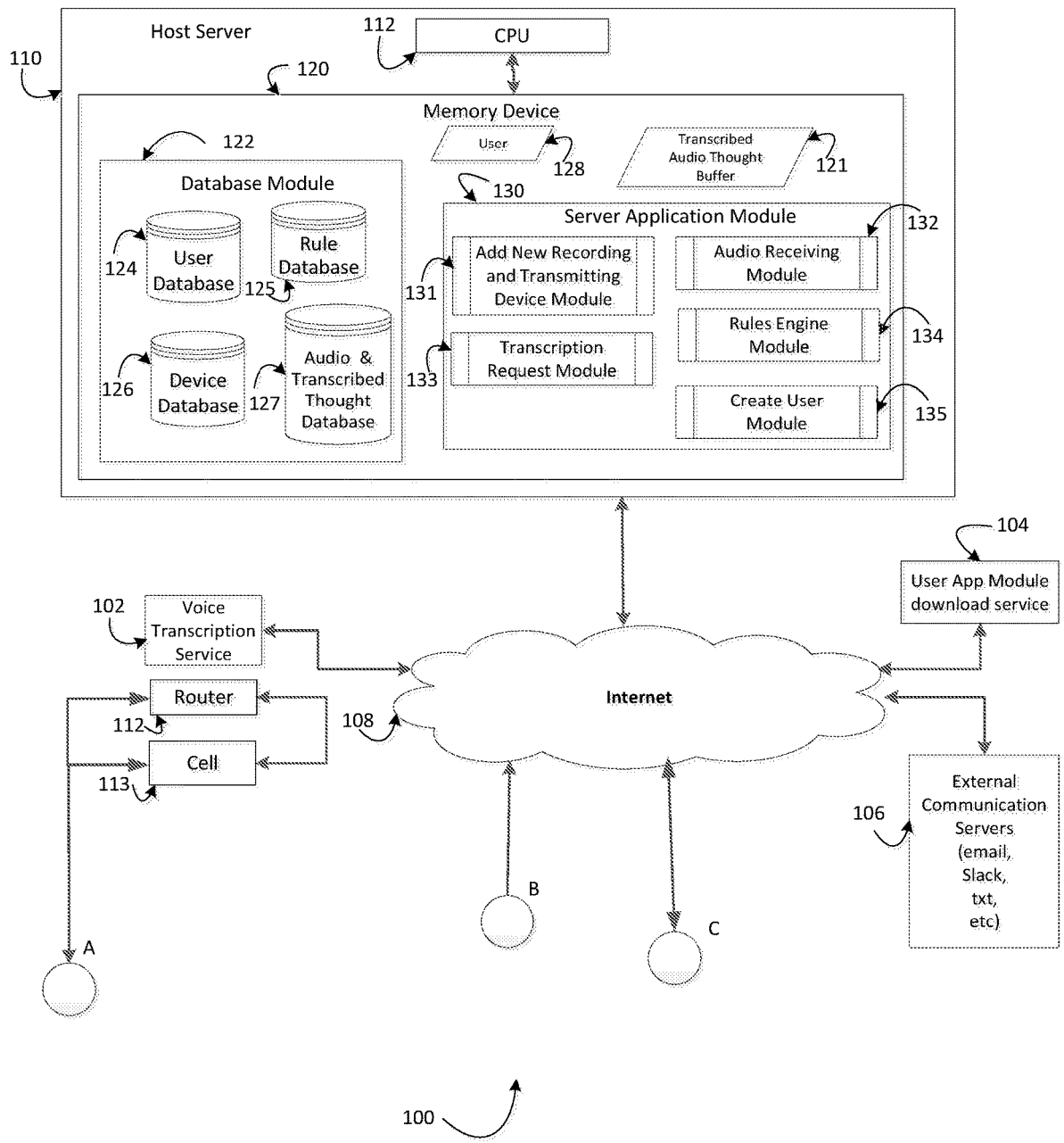
FIG. 1A Architechural Overview

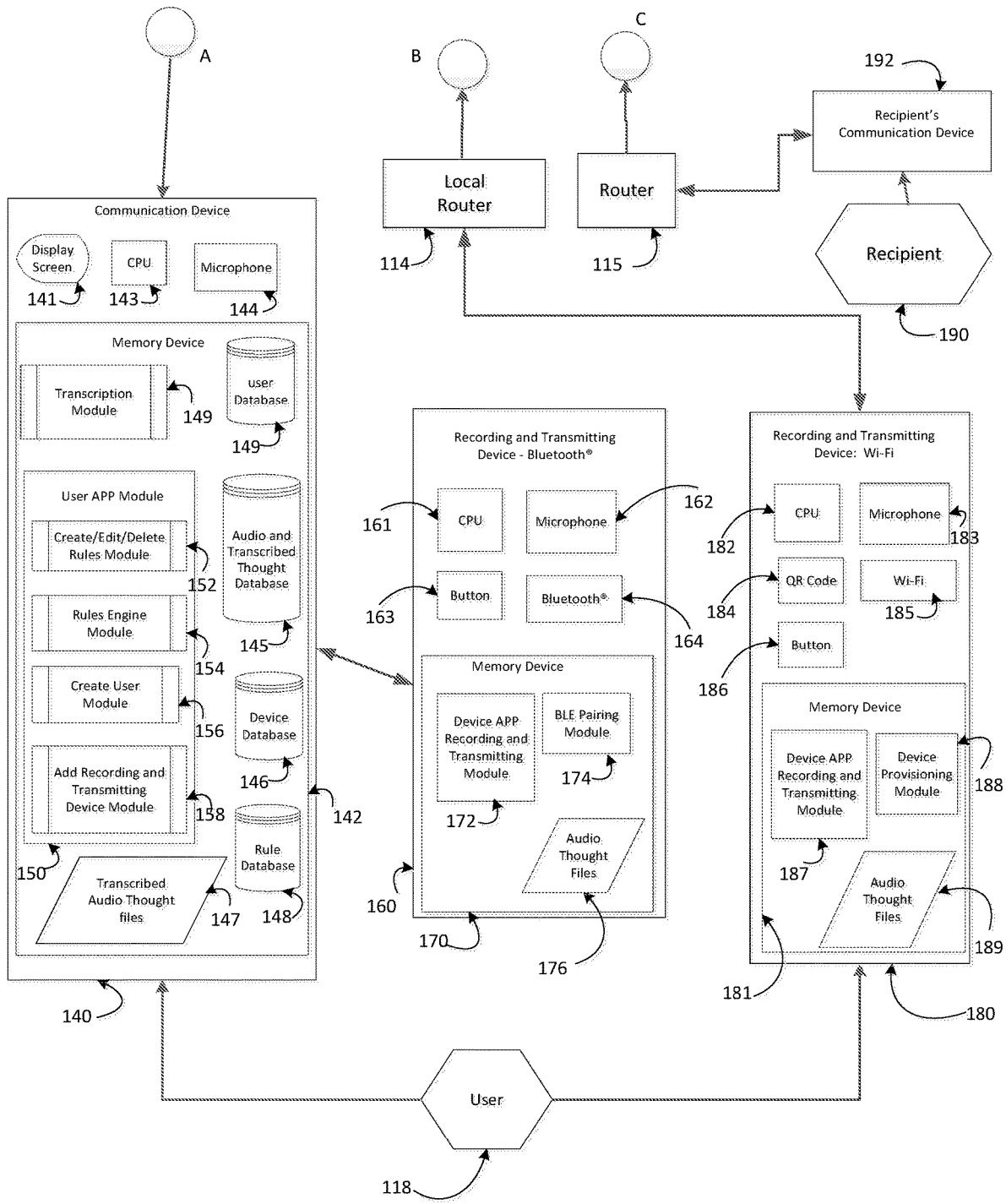
FIG. 1B Architechural Overview

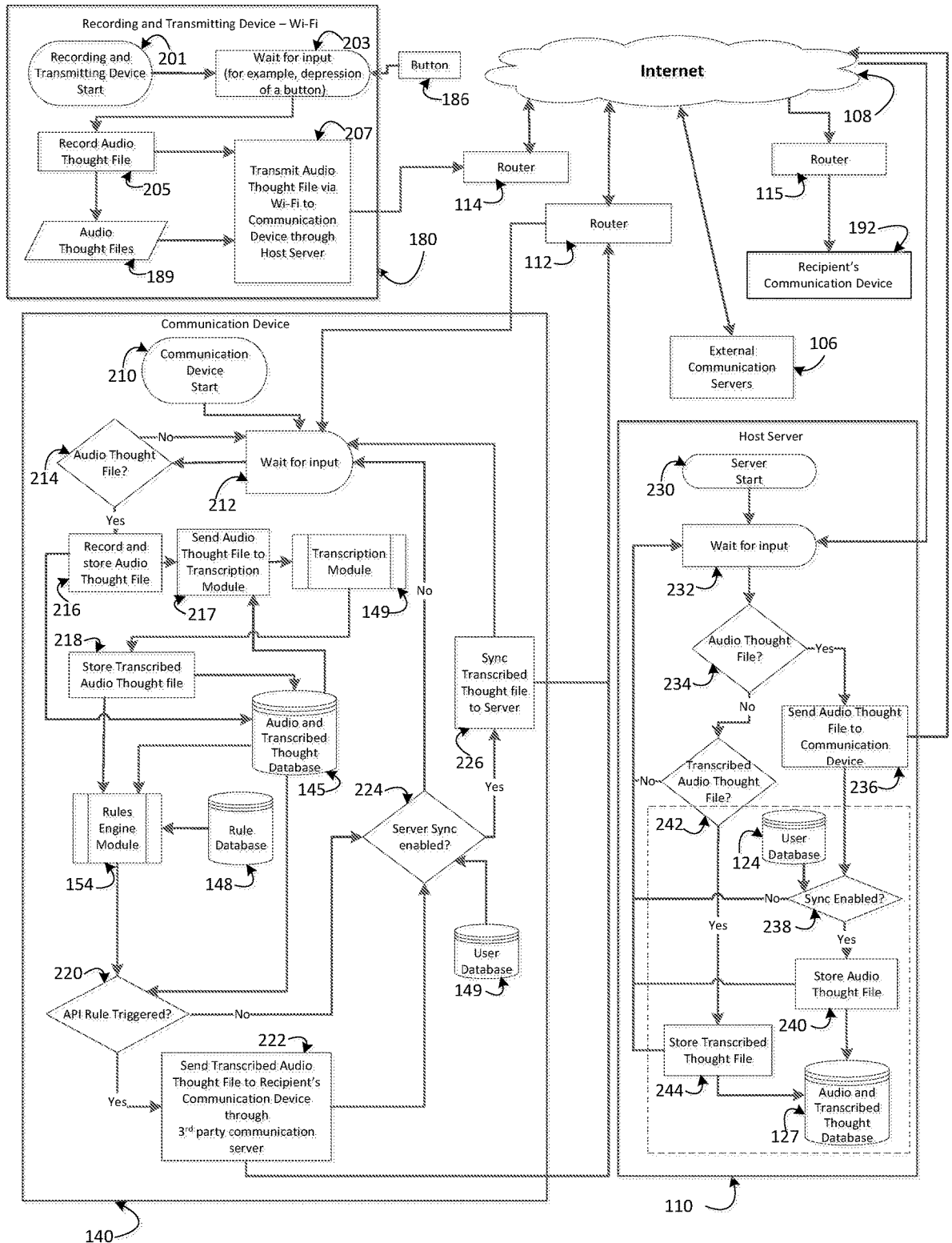
FIG. 2 Wi-Fi Recording and Transmission Device/Local Transcription

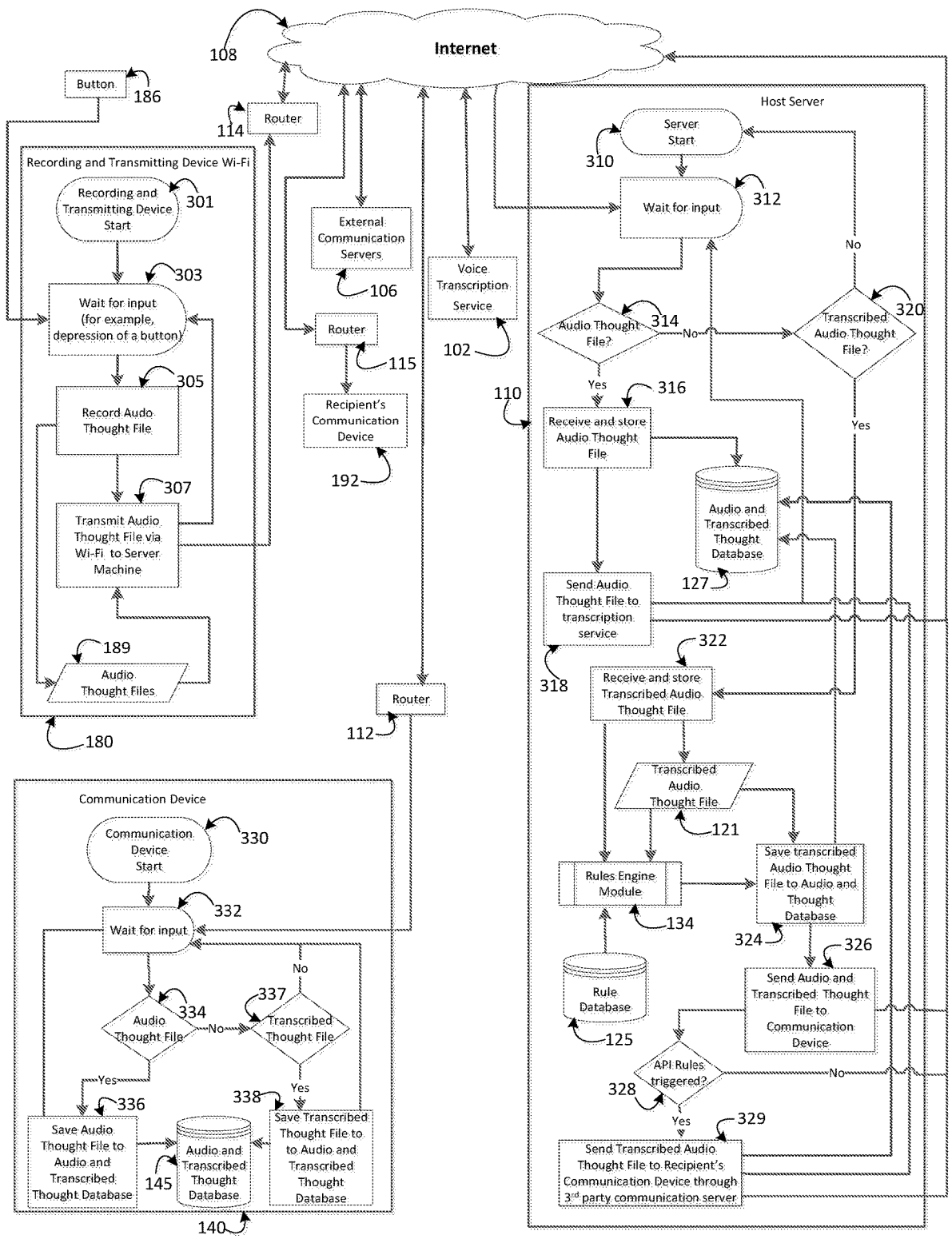
FIG. 3 Wi-Fi Recording and Transmtting Device/3rd Party Transcription

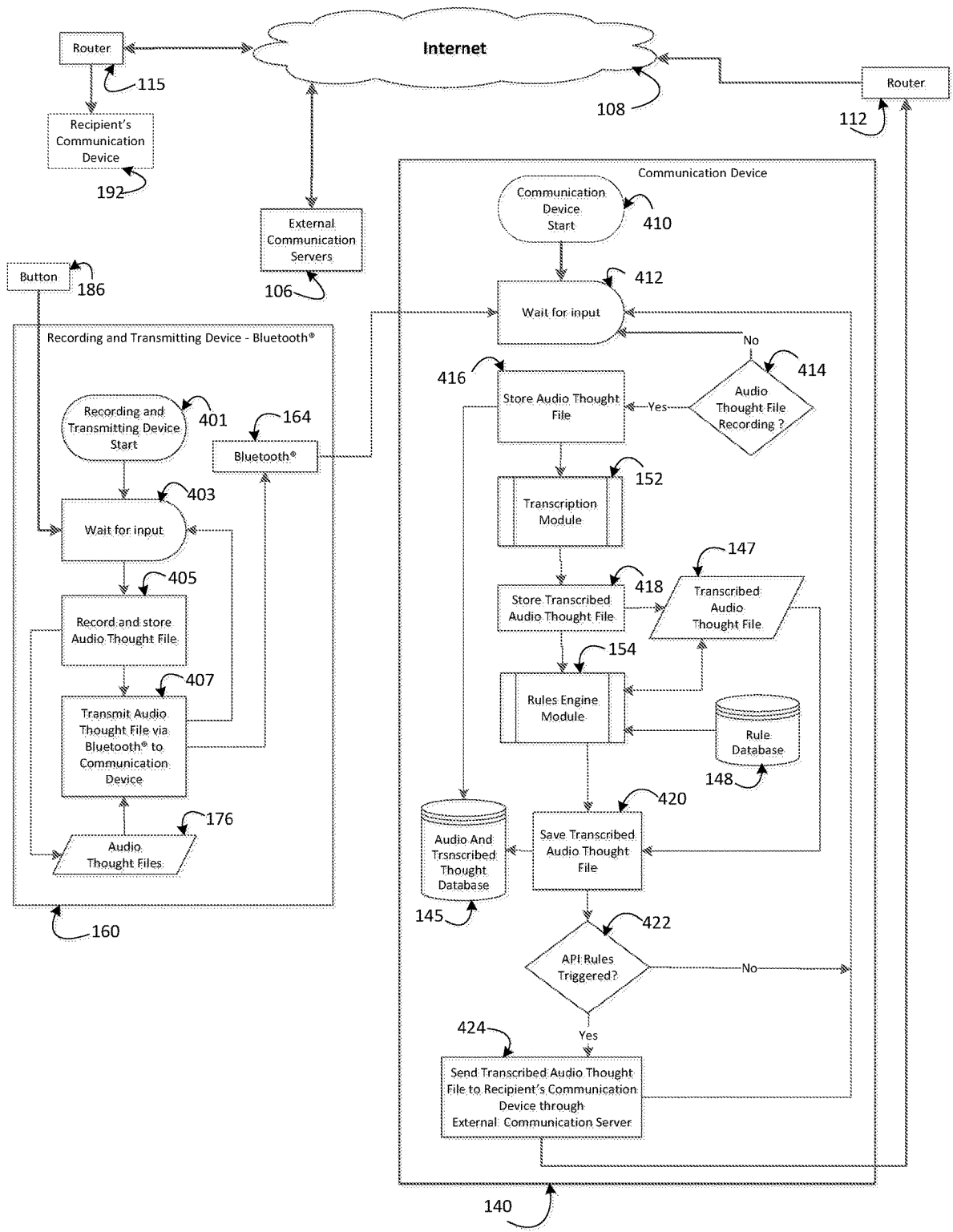
FIG. 4 Bluetooth® Recording and Transmtting Device/Local Transcription

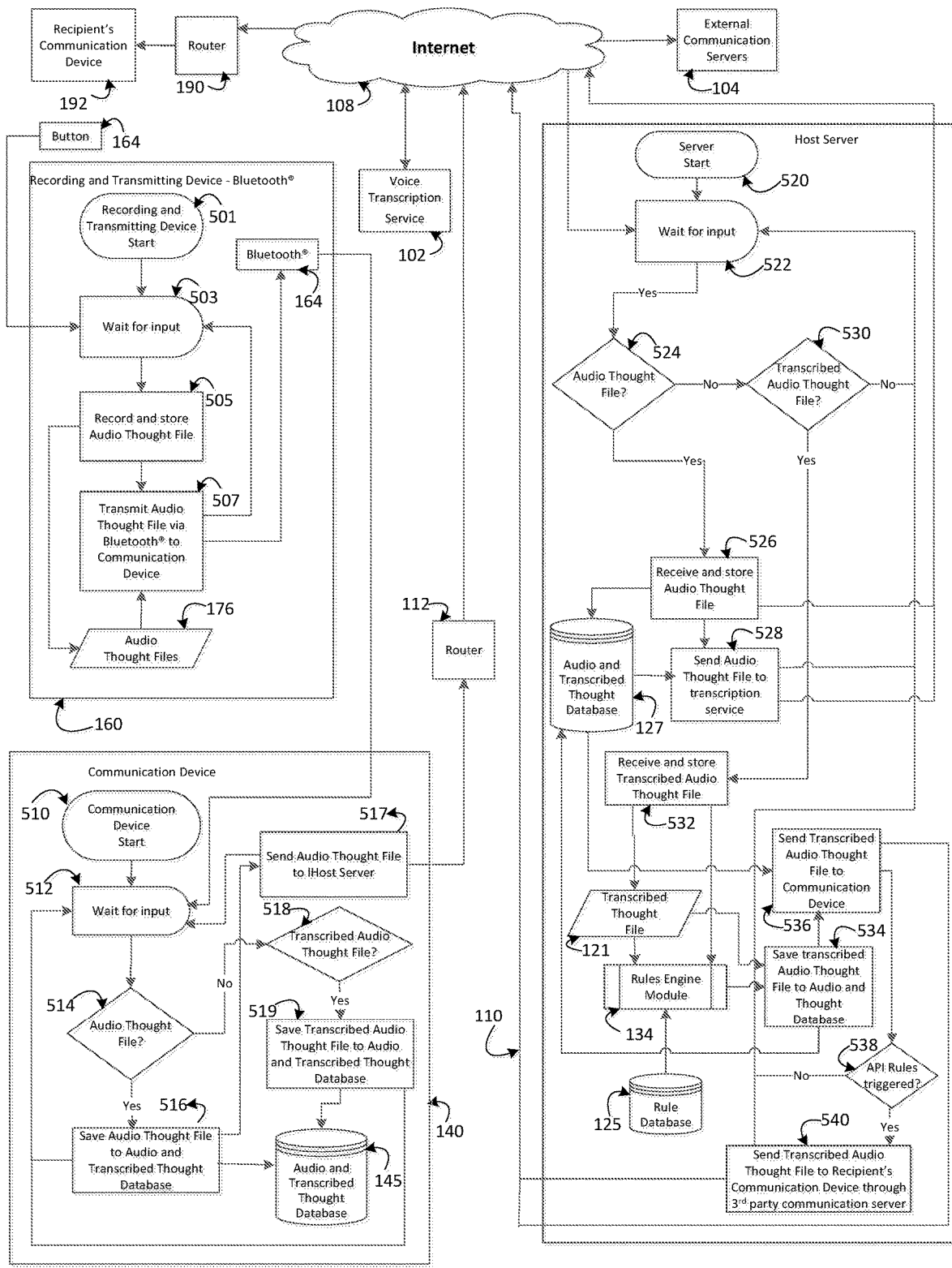
FIG. 5 Bluetooth® Recording and Transmitting Device/3rd Party Transcription

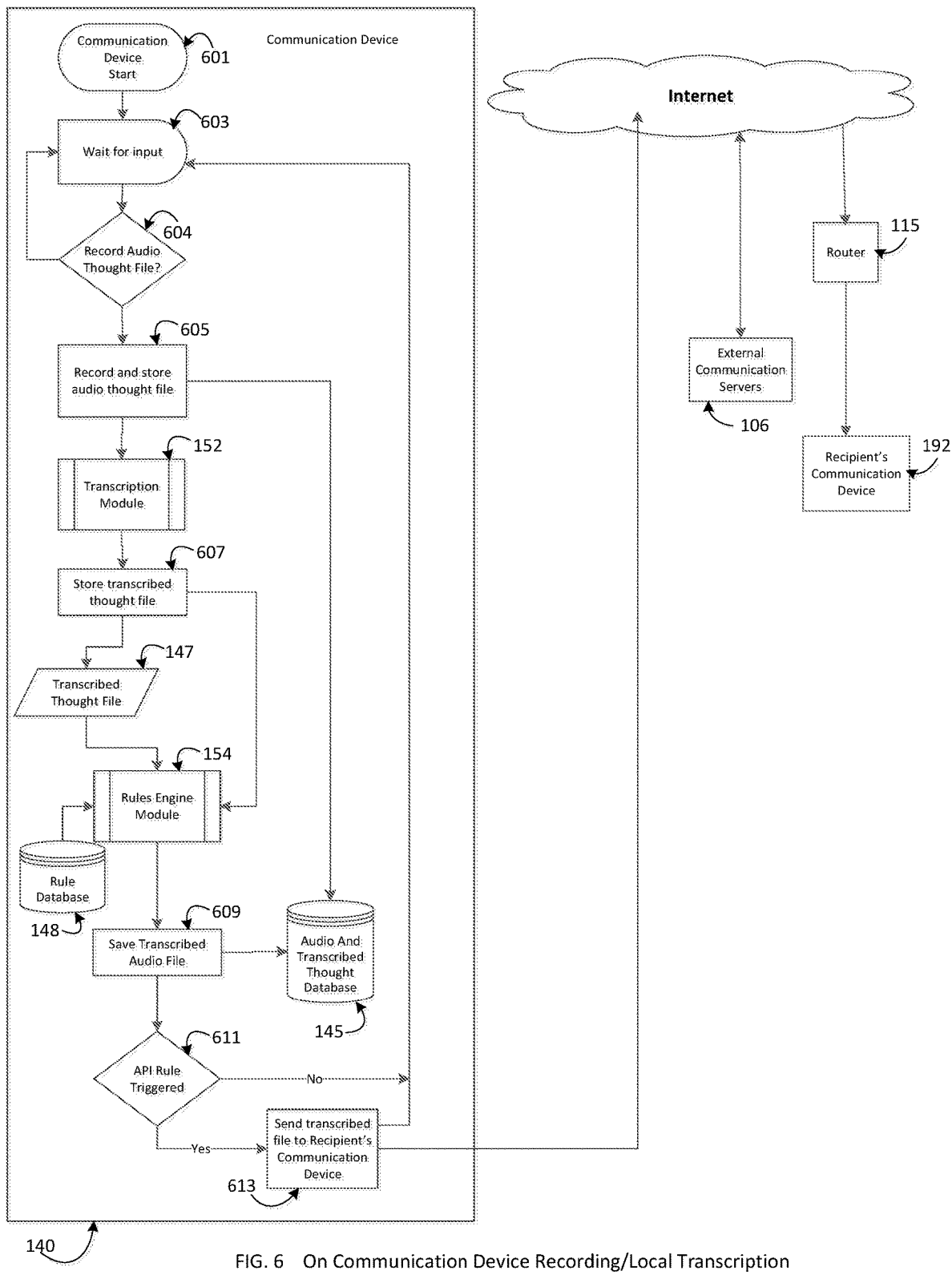
FIG. 6 On Communication Device Recording/Local Transcription

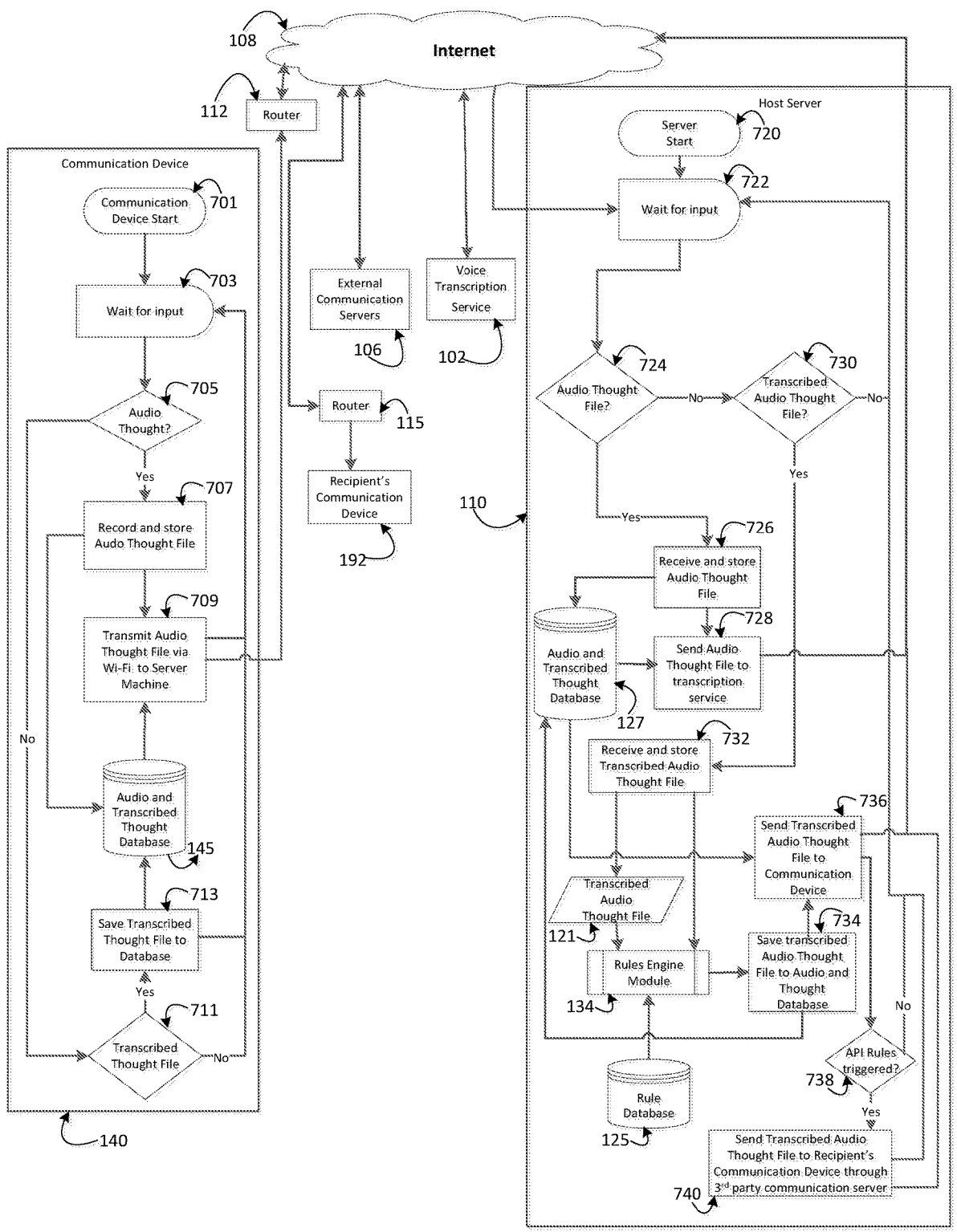
FIG. 7 On Communication Device Recording/ 3rd Party Transcription

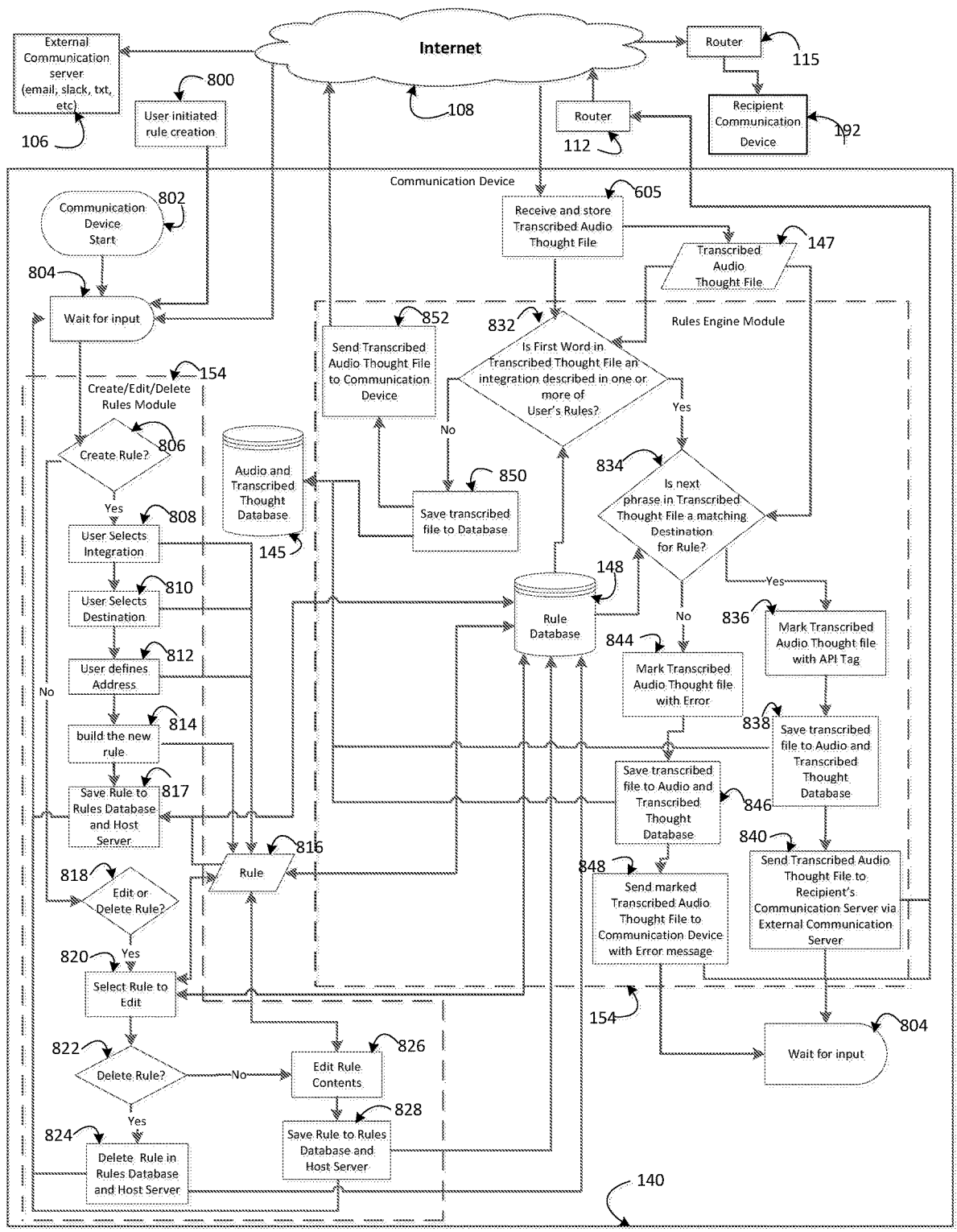
FIG. 8 Rule Engine - Communication Device

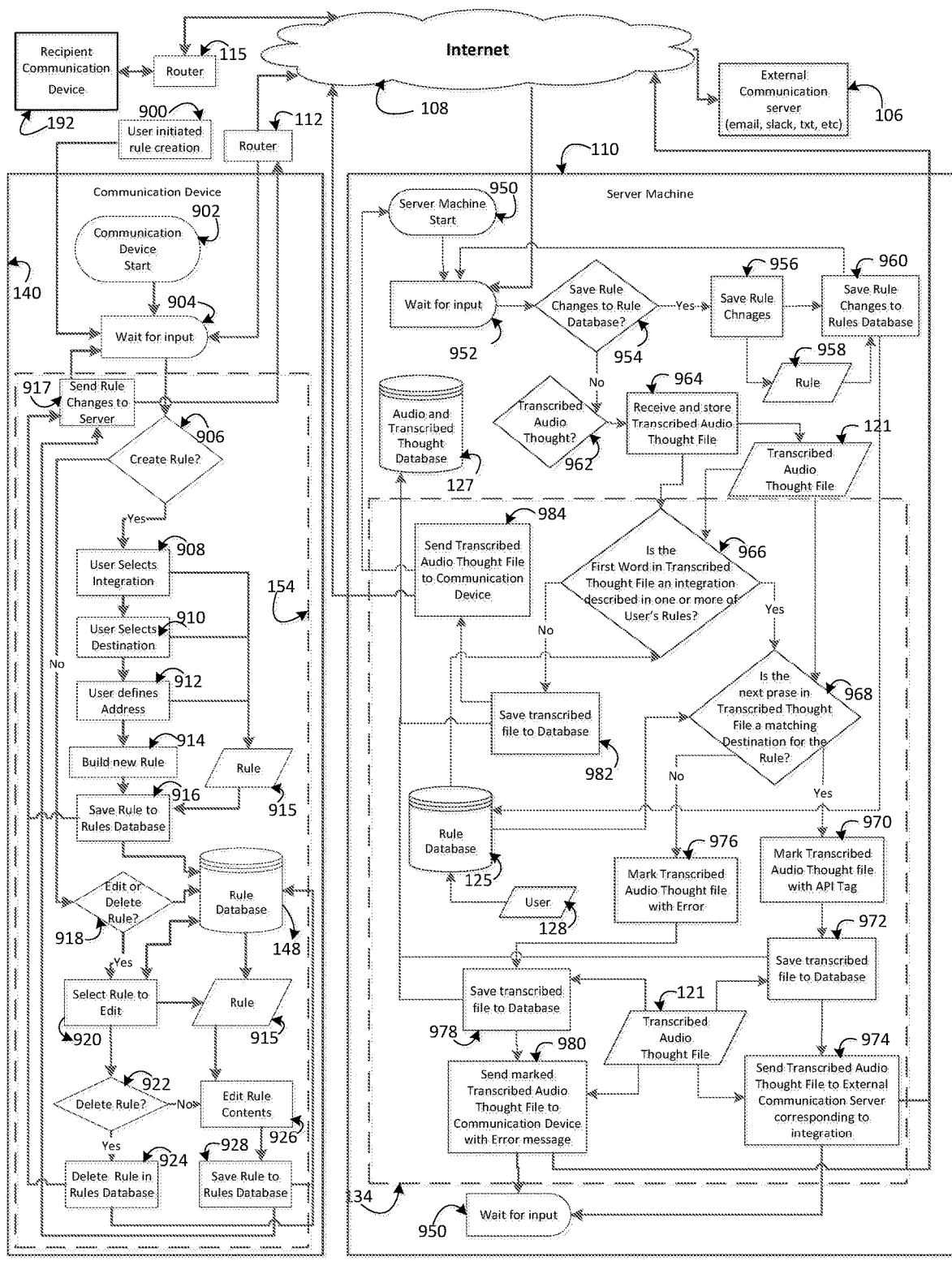
FIG. 9 Rule Engine - Communication Device and Server Device

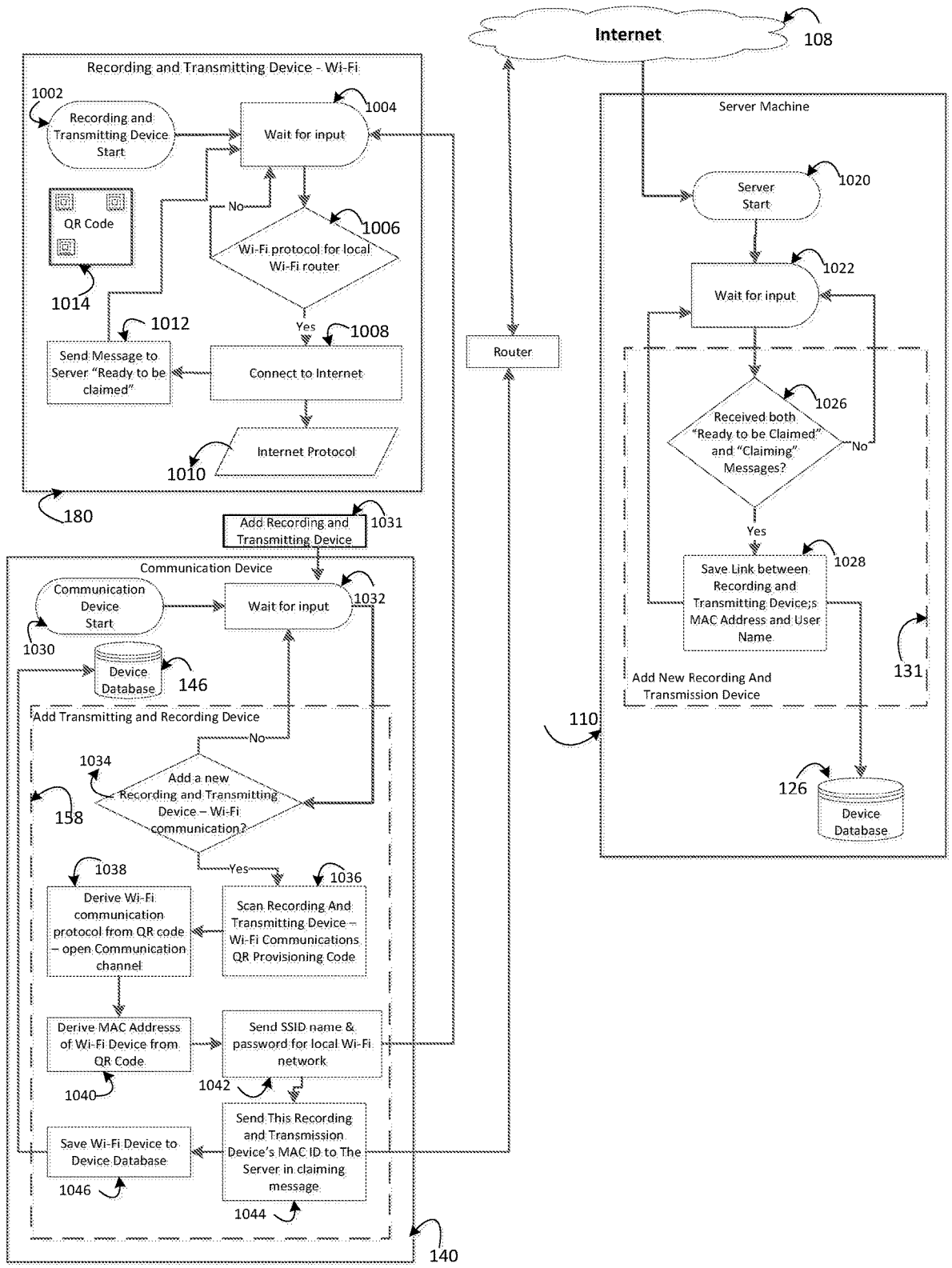
FIG. 10 Add New Device Module – Wi-Fi Protocol

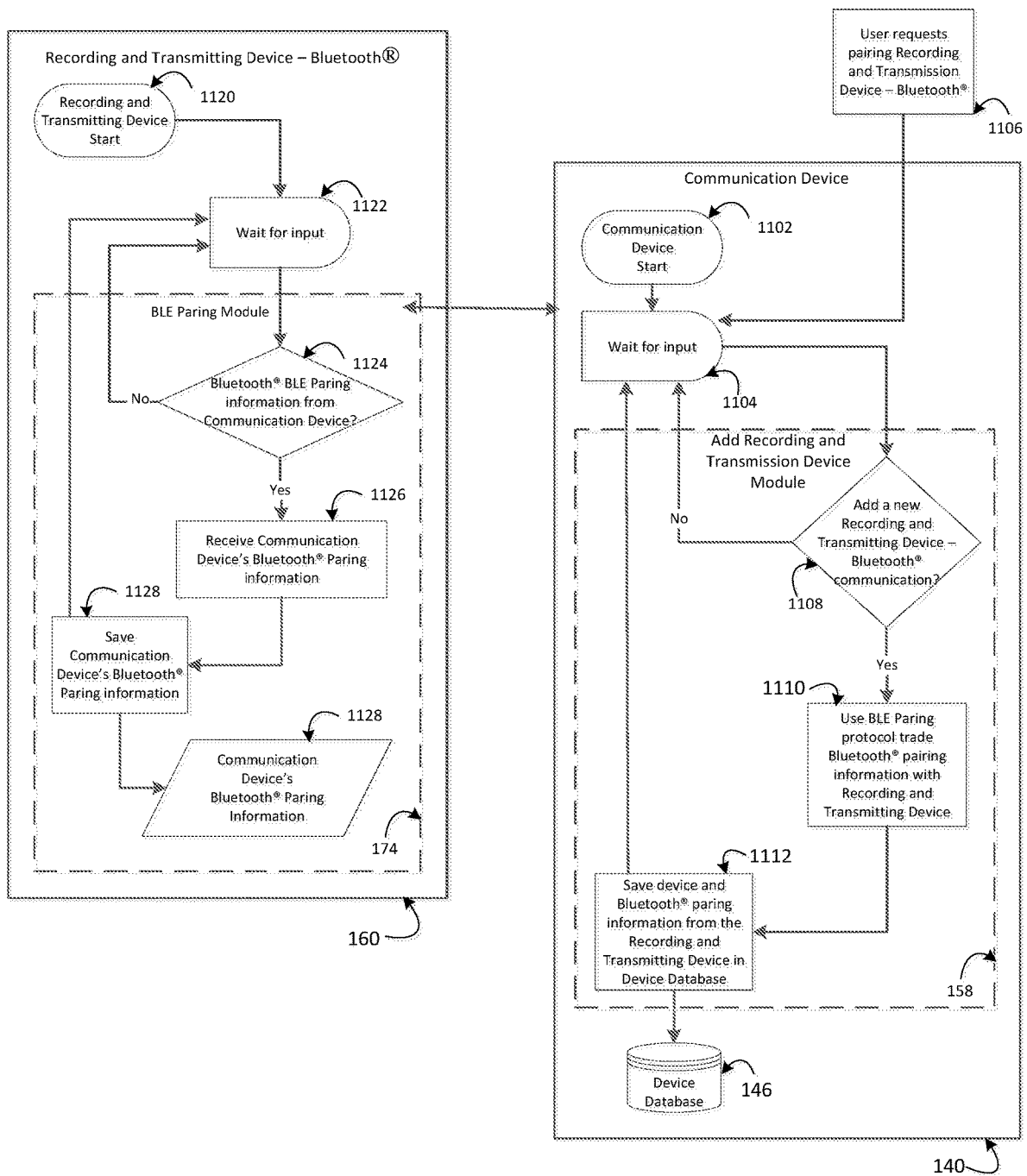
FIG. 11 Add New Device Module – Bluetooth® Protocol

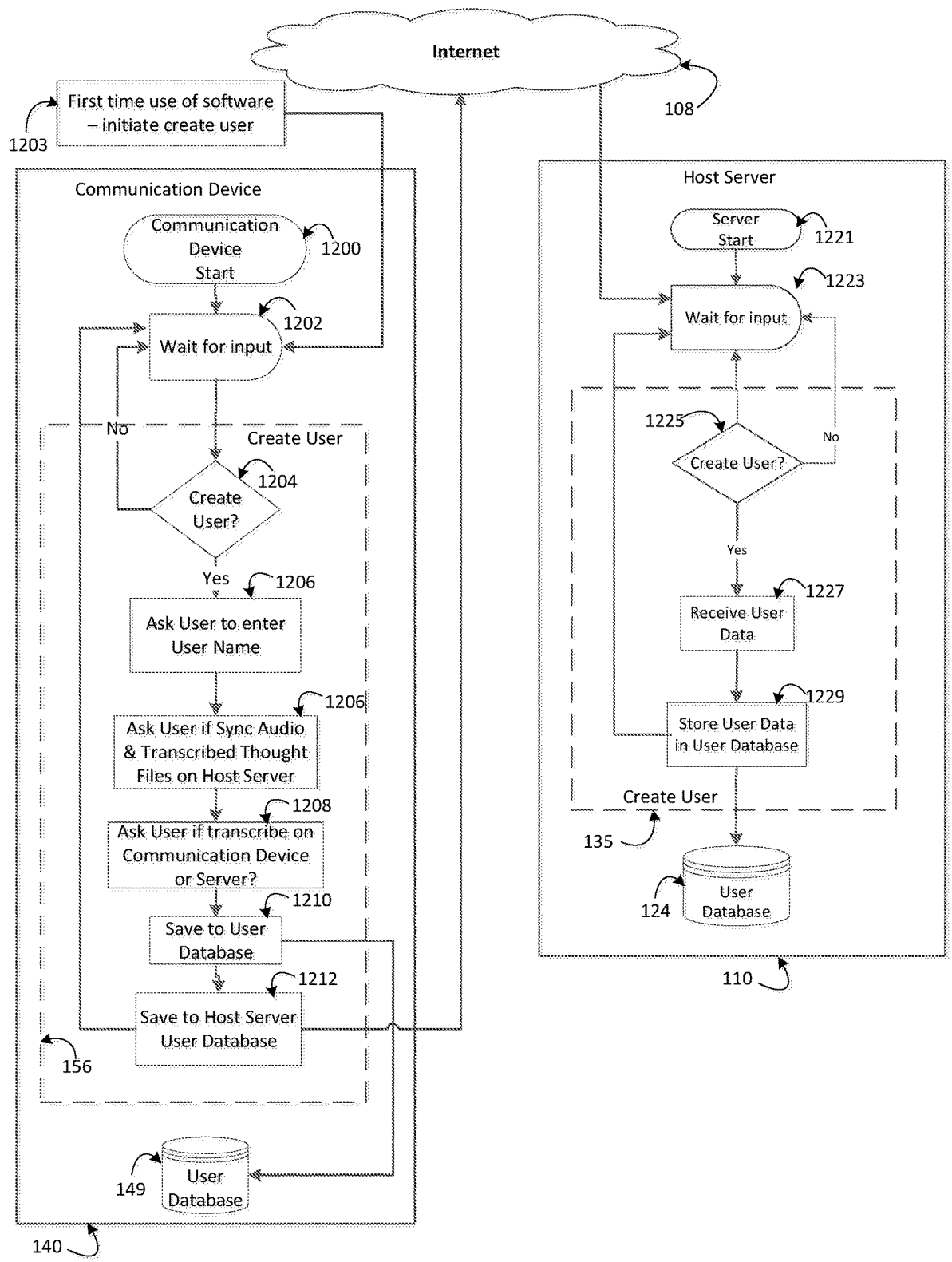
FIG. 12 Create User

| | User ID | Email Address | Groups (Sync, Host Transcription, etc) |
|---|---|---|---|
| 1301 | 1 | joe@glamcor.com | Basic |
| 1302 | 2 | mike@office.com | Sync |
| 1303 | 3 | sam@gmail.com | Sync, Cell |

FIG. 13A  User Database of the Host Server.

| | User ID | MAC Address | Device Name | Last Modified |
|---|---|---|---|---|
| 1310 | 1 | 60:3c:ee:06:51:4a | My CRUSH PRO | 1631301303 |
| 1311 | 2 | 60:33:3e:08:33:23 | Crush Mini | 1631300871 |

FIG. 13B  Device Database of the Host Server

| | User | Integration | Destination | Address |
|---|---|---|---|---|
| 1401 | 1 | Email | Erik | ekaiser@glamcor.com |
|  | 1 | Email | Josh from work | Josh@glamcor.com |
| 1402 | 1 | Slack | Erik | @Erik A. Kaiser |
| 1403 | 1 | Text | Josh K | 1 (555) 555-5555 |
|  | 2 | Email | Joe | jblanx@glamcor.com |
|  | 2 | Slack | Joe | @Joe Blanx |
| 1404 | 2 | Slack | Erik | @Erik A. Kaiser |

FIG. 14A  Rules Data Base of the Host Server

| | Integration | Destination | Address |
|---|---|---|---|
| 1411 | Email | Erik | ekaiser@glamcor.com |
|  | Email | Josh from work | Josh@glamcor.com |
| 1412 | Slack | Erik | @Erik A. Kaiser |
|  | Text | Josh K | 1 (555) 555-5555 |

FIG. 14B  Rule Database of the Communication Device

| | |
|---|---|
| 1501 | Slack Eric I have a new idea for the Server |
| 1502 | Email Eric let's meet today |

FIG. 15  Transcribed Audio Thought buffer Prior to Rules Engine Editing

| | |
|---|---|
| 1601 | #Slack @Erik A. Kaiser I have a new idea for the Server |
| 1602 | #Email ekaiser@glamcor.com let's meet today |

FIG. 16  Transcribed Audio Thought File Text After Editing by Rules Engine

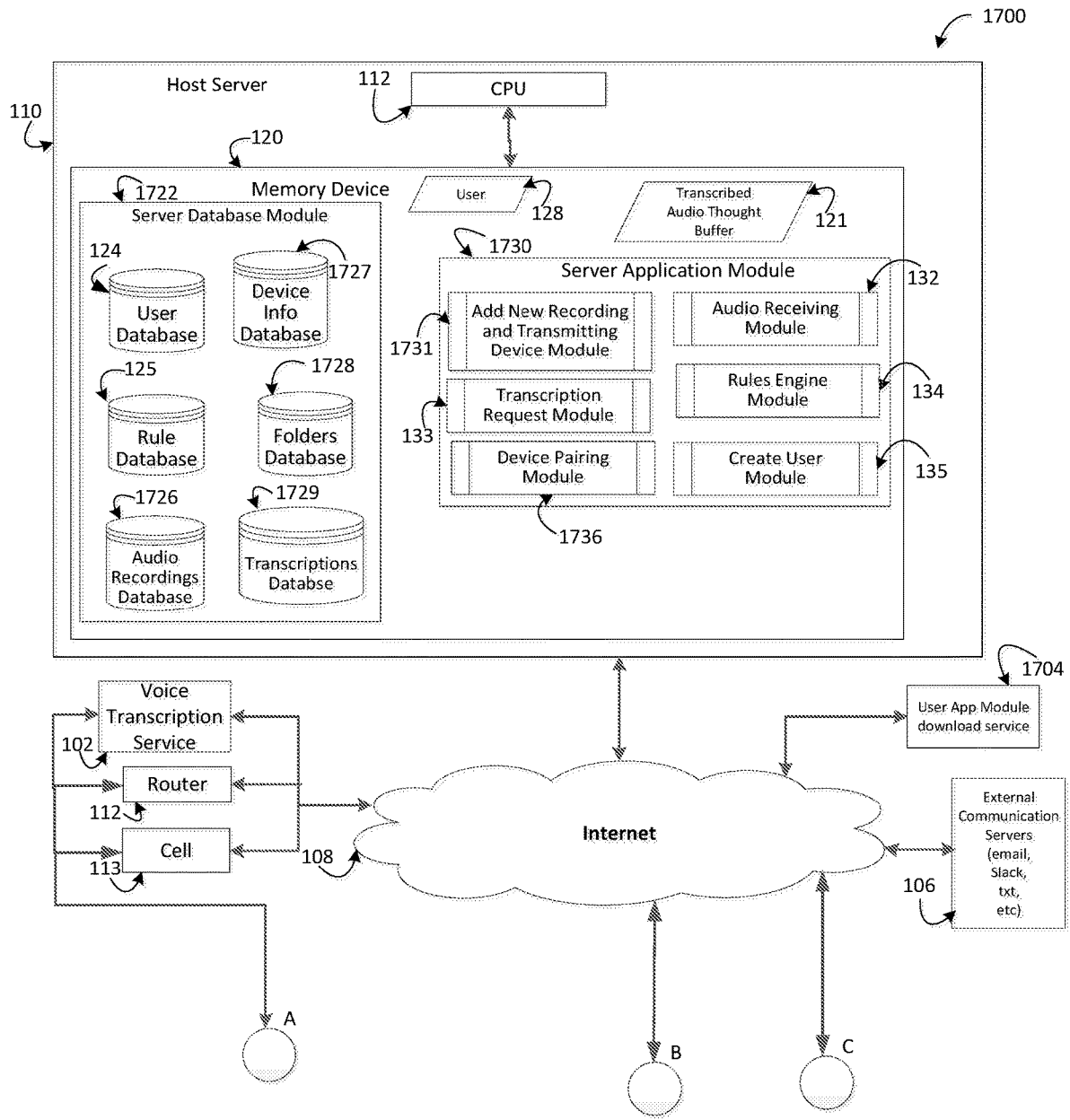
FIG. 17A Architectural Overview

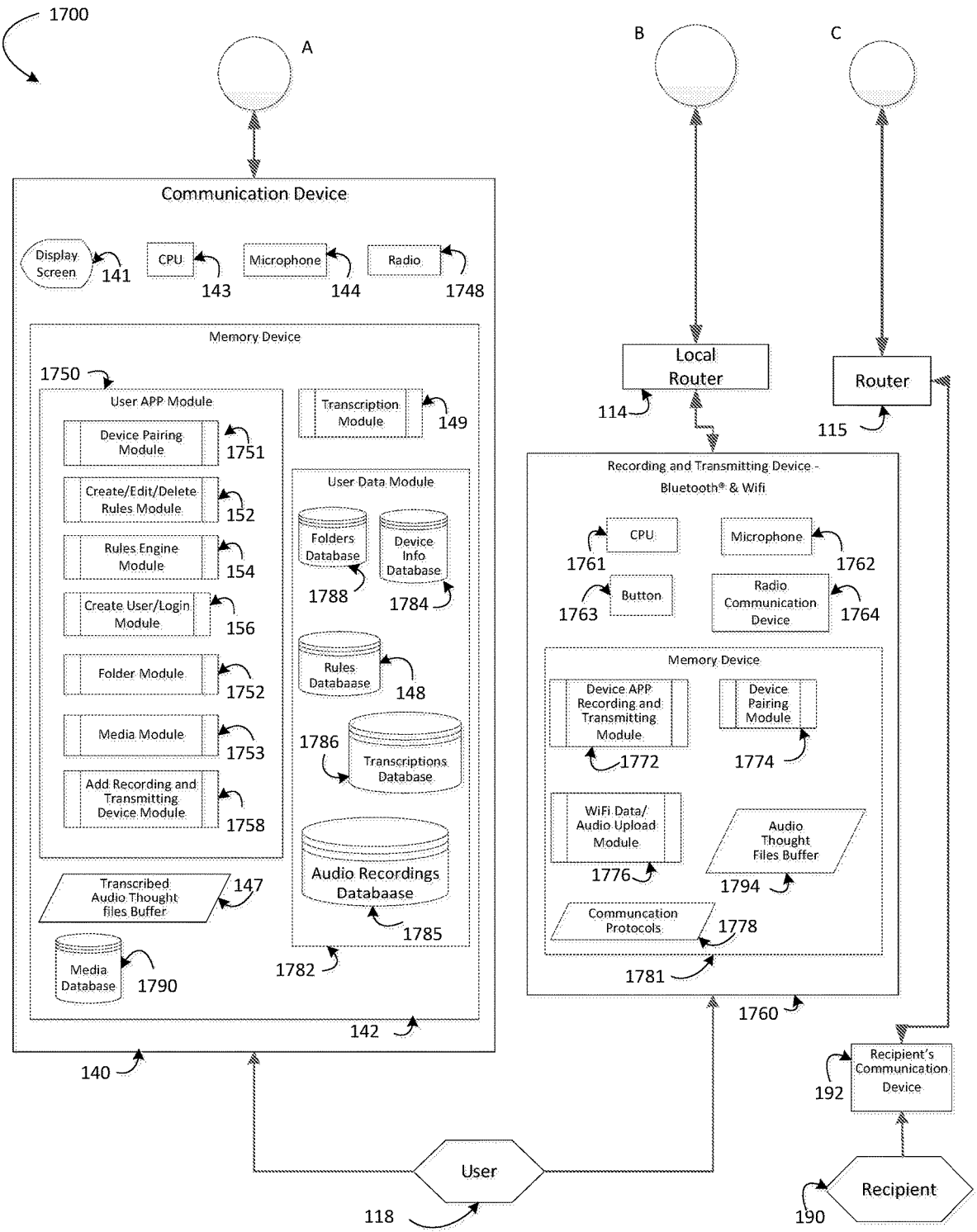
FIG. 17B Architectural Overview

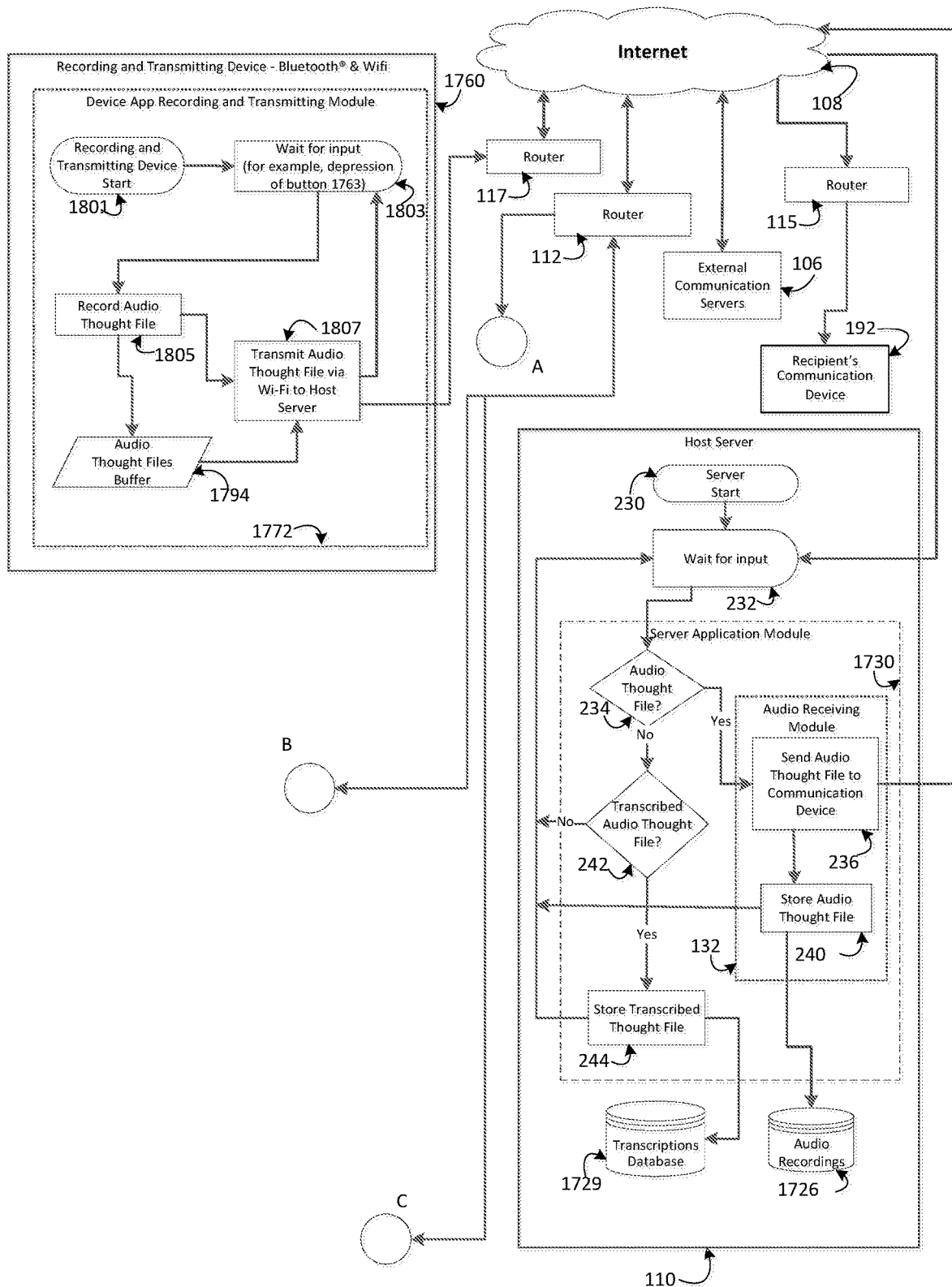
FIG. 18A Wi-Fi Recording and Transmission Device/Comm Device Transcription

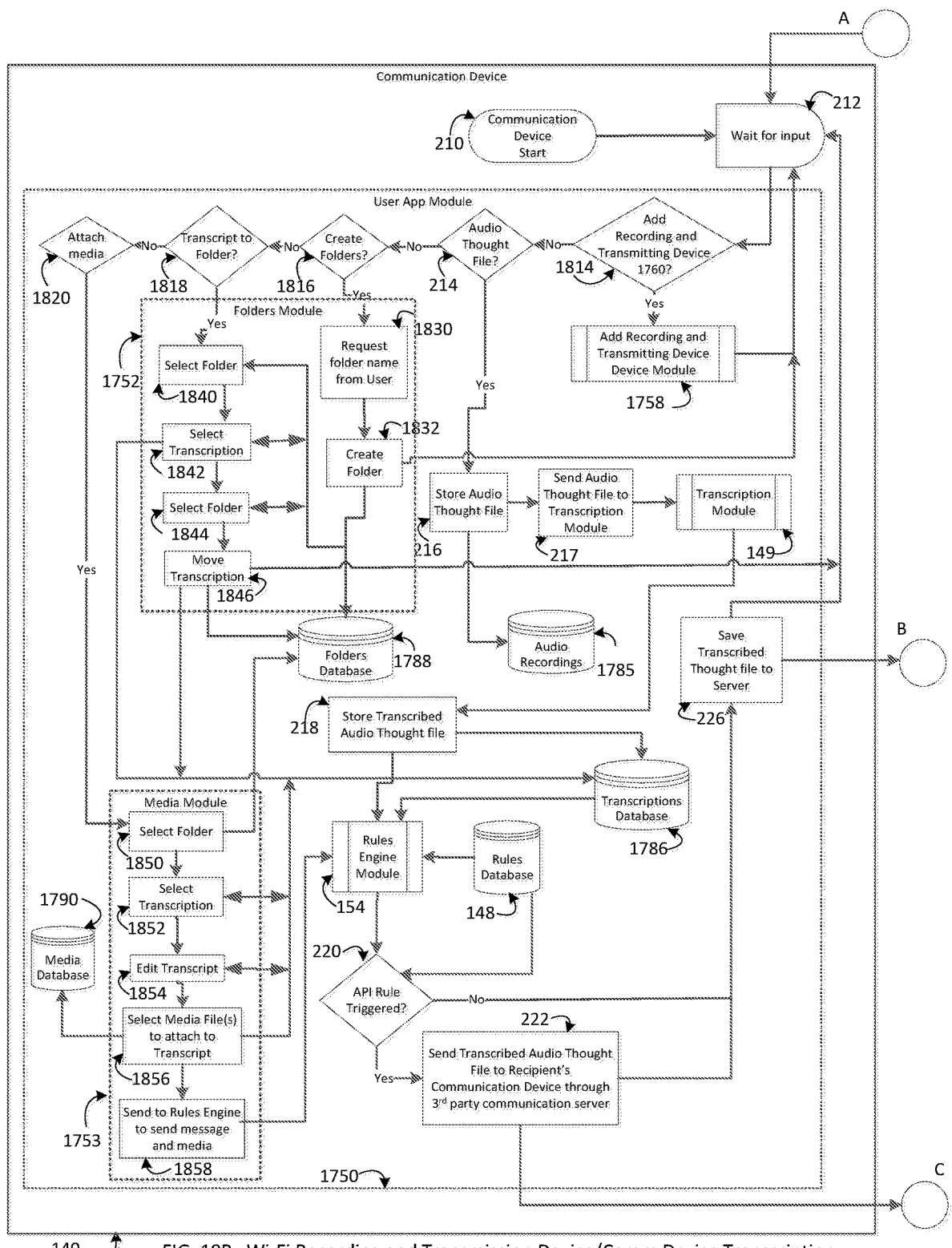
FIG. 18B Wi-Fi Recording and Transmission Device/Comm Device Transcription

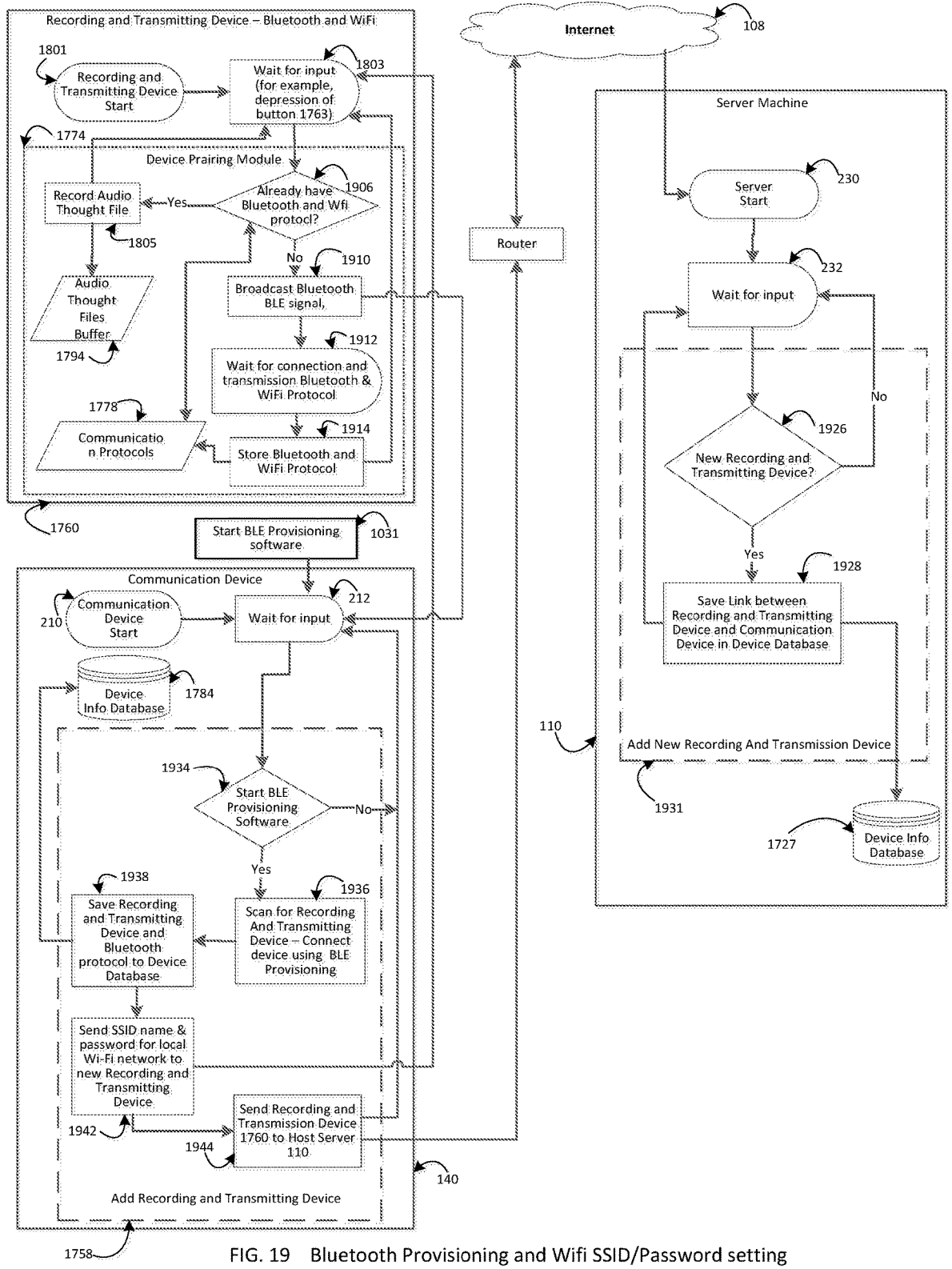
FIG. 19 Bluetooth Provisioning and Wifi SSID/Password setting

SYSTEM AND METHOD FOR REMEMBERING A THOUGHT

CROSS-REFERENCE TO RELATED APPLICATIONS

This application claims priority to U.S. Provisional Application Ser. No. 63/318,297 filed on Mar. 9, 2022, which is hereby incorporated into this specification by reference in its entirety.

BACKGROUND OF THE INVENTION

People often have thoughts that they wish to remember but do not have a convenient and efficient way to memorialize the thought(s) for later use. Conventionally, a person with a sudden thought may write it on a piece of paper or type it into a word processing application stored on a computer or mobile communication device such as a smart phone. Such conventional devices and methods are not convenient and efficient.

SUMMARY OF THE INVENTION

The present invention is a system and method for remembering a thought or message by a person and allowing the person to send the thought or message to a recipient having a Communication Device such as a smart phone. In one embodiment, the system comprises a Communication Device such as a smart phone controlled by the person. The Communication Device comprises a memory device and a User APP Module stored on the memory device. The Communication Device further comprises a transcription module stored on the memory device. The User APP Module comprises a rules engine module stored on the memory device. The system further comprises a Recording and Transmitting Device controlled by the person. The Recording and Transmitting Device comprises a memory device and a Device APP Recording and Transmitting Module stored on the memory device. The Device APP Recording and Transmitting Module is adapted to record an audio thought file by the person that is stored on the memory device. The Device APP Recording and Transmitting Module is further adapted to send the audio thought file to the Communication Device controlled by the person. The transcription module of the Communication Device controlled by the person is adapted to transcribe the audio thought file to create a transcribed audio thought file. The rules engine module of the User APP Module is adapted to check the transcribed audio thought file against a set of rules. The rules engine module of the User APP Module is further adapted to send the transcribed thought file to the Communication Device of the recipient according to the set of rules. The system may further comprise a Host Server comprising a memory device and a Server Application Module stored on the memory device. The Device APP Recording and Transmitting Module is further adapted to send the audio thought file to the Host Server and the Server Application Module of the Host Server is adapted to send the audio thought file to the Communication Device controlled by the person. In one embodiment, the method comprises the steps of: (1) providing a Communication Device in control by the person; (2) providing a Recording and Transmitting Device in control by the person; (3) recording an audio thought by the person on the Recording and Transmitting Device to create an audio thought file; (4) sending the audio thought file from the Recording and Transmitting Device to the Communication Device; (5) transcribing the audio thought file on the Communication Device to create a transcribed audio thought file; (6) checking the transcribed audio thought file against a set of rules on the Communication Device; and (7) sending the transcribed thought file from the Communication Device to the Communication Device of the Recipient according to the set of rules. The method may further comprise the step of providing a Host Server and the step of sending the audio thought file from the Recording and Transmitting Device to the Communication Device further comprises the step of sending the audio thought file from the Recording and Transmitting Device to the Host Server and the Host Server sending the audio thought file to the Communication Device.

BRIEF DESCRIPTION OF THE DRAWINGS

The following description of the invention will be more fully understood with reference to the accompanying drawings in which:

FIG. 1A and FIG. 1B is a high level block diagram of a system for remembering a thought according to a first embodiment the present invention.

FIG. 2 is a high level flow chart showing a first method of operation of the system according to the first embodiment of the present invention, wherein a person records an audio thought on a Wi-Fi enabled Recording and Transmitting Device (for example, a shampoo bottle or shaving mirror). The Audio Thought File is then sent to the person's Communication Device (for example, a smart phone) where the Audio Thought File is transcribed by a Transcription Module to create a Transcribed Audio File that is sent to a Recipient's Communication Device according to a Rules Engine Module.

FIG. 3 is a high level flow chart showing a second method of operation of the system according to the first embodiment of the present invention, wherein a person records a thought on a Wi-Fi enabled Recording and Transmitting Device (for example, a consumer article such as a shampoo bottle, shaving mirror or lighting fixture having recording and transmitting electronics and Wi-Fi) that is then sent to the Host Server of the system and the Host Server obtains a Transcribed Audio Thought file from an external transcription service and sends the Transcribed Audio File to a Recipient's Communication Device according to a Rules Engine Module.

FIG. 4 is a high level flow chart showing a third method of operation of the system according to the first embodiment of the present invention, wherein a person records an audio thought on a Bluetooth® enabled Recording and Transmitting Device (for example, a consumer article such as a shampoo bottle, shaving mirror or lighting fixture having recording and transmitting electronics and Bluetooth®) that is then sent to the person's Communication Device (for example, a smart phone) where the Audio Thought File is transcribed by a Transcription Module to create a Transcribed Audio File that is sent to a Recipient's Communication Device according to a Rules Engine Module.

FIG. 5 is a high level flow chart showing a fourth method of operation of the system according to the first embodiment of the present invention, wherein a person records an audio thought on a Bluetooth® enabled Recording and Transmitting Device (for example, a consumer article such as a shampoo bottle, shaving mirror or lighting fixture having recording and transmitting electronics and Bluetooth® that is then sent to the person's Communication Device. The Audio Thought File is sent to the Host Server that obtains a Transcribed Audio Thought file from an external transcription service and sends the Transcribed Audio File to a Recipient's Communication Device according to a Rules Engine Module.

FIG. 6 is a high level flow chart showing a fifth method of operation of the system according to the first embodiment of the present invention, wherein a person records an audio thought on his or her Communication Device (for example a smart cell phone) and an Audio Thought File is transcribed by a Transcription Module stored on the person's Communication Device to create a Transcribed Audio File that is sent to a Recipient's Communication Device according to a Rules Engine Module.

FIG. 7 is a high level flow chart showing a sixth method of operation of the system according to the first embodiment of the present invention, wherein a person records an audio thought on his or her Communication Device (for example a smart cell phone) that is then sent to the Host Server of the system and the Host Server obtains a Transcribed Audio Thought file from an external transcription service and sends the Transcribed Audio File to a Recipient's Communication Device according to a Rules Engine Module.

FIG. 8 is a high level flow chart showing the operation of a Create/Edit/Delete Rules Module and Rules Engine Module on the person's Communication Device according to the first embodiment of the present invention, wherein the Create/Edit/Delete Rules Module permits the User to create new Rules and edit or delete existing Rules. The Rules Engine Module receives the person's Transcribed Audio Thought File, compares the thought file to each of the rules checking for corresponding instructions and uses corresponding rule to update the text to send the Transcribed Audio File to a Recipient's Communication Device.

FIG. 9 is a high level flow chart showing the operation a Create/Edit/Delete Rules Module on the User's Communication Device and Rules Engine Module on the Host Server according to the first embodiment of the present invention, wherein the Create/Edit/Delete Rules Module permits the User to create new Rules and edit or delete existing Rules. The Rules Engine Module receives the person's transcribed audio thought file, compares the thought file to each of the person's rules checking for corresponding instructions and uses corresponding rule to update the text to send the Transcribed Audio File to a Recipient's Communication Device.

FIG. 10 is a high level flow chart showing the operation of an Add Recording and Transmitting Device Module stored on the person's Communication Device and working with a Device Provisioning Module of a Wi-Fi enabled Recording and Transmitting Device to provision a Recording and Transmitting Device to the person's Communication Device and transmits provisioning of a Recording and Transmitting Device to the Host Server.

FIG. 11 is a high level flow chart showing the additional operation of an Add Recording and Transmitting Device Module stored on the person's Communication Device and working with a Device Provisioning Module of a Bluetooth® enabled Recording and Transmitting Device to provision a Recording and Transmitting Device to the person's Communication Device.

FIG. 12 is a high level flow chart showing the operation of the Create User Module on the person's Communication Device and the Create User Module of the Host Server.

FIG. 13A is a block diagram showing an example of data items that are stored in a User Database of the Host Server.

FIG. 13B is a block diagram showing an example of data items that are stored in User Database of the person's Communication Device.

FIG. 14A is a block diagram showing an example of data items that are stored in a Rules Data Base of the Host Server.

FIG. 14B is a block diagram showing an example of data items that are stored in the Rule Database of the person's Communication Device.

FIG. 15 is a block diagram showing examples of Transcribed Audio Thought Files as transcribed by the Transcription Engine Module from recorded Audio Thought Files.

FIG. 16 is a block diagram showing examples of Transcribed Audio Thought Files after they have been updated by the Rules Engine Module according to a specific corresponding rule in the Rules Database.

FIG. 17A and FIG. 17B is a high-level block diagram of a system for remembering a thought according to a second embodiment of the present invention.

FIGS. 18A and 18B is a high-level flow chart showing a method of operation of the system according to the second embodiment of the present invention, wherein a person records an audio thought on a dual Bluetooth® and Wi-Fi enabled Recording and Transmitting Device (for example, a shampoo bottle or shaving mirror). The Audio Thought File is then sent to the Host Server which stores the Audio Thought file. The Host Server then sends Audio Thought File to the person's Communication Device (for example, a smart phone) where the Audio Thought File is transcribed by a Transcription Module to create a Transcribed Audio File that is sent to a Recipient's Communication Device according to a Rules Engine Module. The person's Communication Device then sends the Transcribed Audio File to the Host Server which stores the Transcribed Audio Thought file.

FIG. 19 is a high-level flow chart of another embodiment of the present invention showing the addition of an Add Recording and Transmitting Device Module stored on the person's Communication Device and working with a Device Pairing Module of a Bluetooth® and Wi-Fi enabled Recording and Transmitting Device to provision a Recording and Transmitting Device to the person's Communication Device as well as providing Wi-Fi Communication protocol parameters.

DESCRIPTION OF THE INVENTION

Referring to FIG. 1A and FIG. 1B, the present invention is a system 100 generally comprising a Host Server 110 comprising a Server Application Module 130 stored on a Memory device 120, and an User APP Module 150 that can be downloaded over an internet 108 by a person (user) 118 to his or her Communication Device 140 by an external User App Module download service 104 such as the Apple App Store for Apple communication devices and Google Play for Android communication devices. In the embodiment shown, Host Server 110 is an Amazon® Cloud based server. However, Host Server 110 can be any type of conventional cloud based or dedicated server that is widely available. System 100 is generally adapted so person or user 118 can easily record an Audio Thought File from one or more Recording and Transmitting Devices 160 and 180 controlled by user 118 and transmit or send the Audio Thought File to the Communication Device 140 or Host Server 110 for transcription to a Transcribed Audio Thought File that is sent to an External Communication Server 106 (such as Email, SLACK or text) that sends the Transcribed Audio Thought File to Communication Device 192 of a different person or Recipient 190. The term "Communication Device" means any conventional computing device such as an android or apple smart cell phone, a tablet, a computer work station, a laptop computer, a desktop computer, or the equivalent to any thereof whether presently existing or futurely developed. The term "Recording and Transmitting Device" means any product or device that is not a Communication Device and having electronics and/or software capable of recording an Audio Thought File and transmitting that Audio Thought File to a Communication Device (for example, via Bluetooth®) or to a Host Server (for example, via Wi-Fi). The Recording and Transmitting Device may be any type of stand-alone device or product or formed as part of a device or product or attached to any type of product or device. By way of example only, the Recording and Transmitting Device may sit on a table, be attached to a wall or worn on a person's body or be part of a product such as a watch, shaving mirror, lamp or shampoo bottle. The term "Module" means any type of conventional or futurely developed software code and/or firmware used to instruct a CPU or other computing device to perform various tasks.

Referring to FIG. 1A, Host Server 110 generally comprises a Central Processing Unit 112 and a Memory Device 120. Host Server 110 further comprises a Data Base Module stored on Memory Device 120 and a Server Application Module 130 stored on Memory Device 120. As will be described more fully herein, Server Application Module 130 is generally adapted to receive Audio and Transcribed Thought Files, process them according to a set of rules stored in Rule Database 125 and store copies of them in the Audio and Transcribed Thought Database 127 if User 118 requested sync as well as store lists of users in User Database 124, their devices in the Device Database 126 and rules they have defined in the Rule Database 125.

Database Module 122 comprises a User Database 124, a Rule Database 125, a Device Database 126, and an Audio and Transcribed Thought Database 127. User Database 124 is generally adapted to store information of a person 118 that has downloaded User APP Module 150 and signed into Host Server 110. Rule Database 125 is generally adapted to store a set of rules (to be described) created by person 118. Device Database 126 is generally adapted to store information of Recording and Transmitting Devices 160 and 180 that have been added by person 118. Audio and Transcribed Thought Database 127 is generally adapted to store an Audio Thought File recorded by person 118 on Communication Device 140 or Recording and Transmitting Devices 160 and 180. Audio and Transcribed Thought Database 127 is further adapted to store a Transcribed Audio Thought File of the Audio Thought File. Server Application Module 130 comprises an Add New Recording and Transmitting Device Module 131, an Audio Receiving Module 132, a Transaction Request Module 133, a Rules Engine Module 134, a Create User/Login Module 135, and a Transcribed Audio Thought Buffer 121. Add New Recording and Transmitting Device Module 131 is generally adapted to add Recording and Transmitting Devices 140 and 160 to Host Server 110. Audio Receiving Module 132 is generally adapted to receive Audio Thought File recordings from Recording and Transmitting Device 180 and a Communication Device 140. Transcription Request Module 133 is generally adapted to send received Audio Thought File recordings to an internet-based Voice Transcription Service 102 and to receive a Transcribed Audio Thought File. Rules Engine Module 134 is generally adapted to examine the initial words of a Transcribed Audio Thought File to determine if they match any of User's 108 rules as stored in the Rule Database 125, edit the transcription according to corresponding rule and transmit the updated Transcribed Audio Thought File to Recipient 190 using an External Communication Server 106. Create User/Login Module 135 is generally adapted to create an account for a new User 118, specifying Communication Device 140, desire to Sync Audio and Transcribed Thought Files, and other account related information. Transcribed Audio Thought Buffer 121 is generally adapted to hold an Audio Thought File when received by Host Server 110, edited by the Rules Engine Module 134 and stored in Audio and Transcribed Thought Database 127. Connected to the internet 108 are a number of external internet devices that are used by Host Server 110 to accomplish various tasks (to be described). Such external internet devices are well known in the art and include a Voice Transcription Service 102 such as Otter.ai, a User App Module Download Service 104 such as Google Play Store, and an External Communication Servers 106 such as E-mail, Slack or SMS text.

Referring to FIG. 1B, Communication Device 140 generally comprises a Central Processing Unit 143, a Microphone 144, and a Memory Device 142. Communication Device 140 also needs to have a router to be connected to Internet 108 which can be a Router 112 or a Cell phone tower router 113. Router 112 may be any commercially available internet Wi-Fi router. Communication Device 140 further comprises a User APP Module 150. As will be described more fully herein, User APP Module 150 is generally adapted to hold all of the application modules that execute the application specific software associated with Communication Device 140. Communication Device 140 further comprises an Audio and Transcribed Thought Database 145 created by User APP Module 150 and stored on Memory Device 142. Audio and Transcribed Thought Database 145 is generally adapted to store an Audio Thought File recorded by person 118 on Communication Device 140 or Recording and Transmitting Devices 160 and 180. Audio and Transcribed Thought Database 135 is further adapted to store a Transcribed Audio Thought File of the Audio Thought File. Communication Device 140 further comprises a Device Database 146 created by User APP Module 150 and stored on Memory Device 142. Device Database 146 is generally adapted to store information of Recording and Transmitting Devices 160 and 180 that have been added by person 118. Communication Device 140 further comprises a Rule Database 148 created by User APP Module 150 and stored on Memory Device 142. Rule Database 148 is generally adapted to store a set of rules (to be described) created by person 118 that are checked by a Rules Engine 154 (to be described) to send a Transcribed Audio Thought File to a Recipient according to the set of rules. Communication Device 140 further comprises a Transcribed Thought Files buffer 147 created by User APP Module 150. Transcribed Audio Thought Buffer 147 is generally adapted to hold an Audio Thought File when recorded by Communication Device 140 or received from Recording and Transmitting Device. Communication Device 140 further comprises a Transcription Module 149 that is generally adapted to transcribe an Audio Thought File. In the embodiment shown, Transcription Module 149 is a conventional transcription software application that may be existing part of Communication Device 140 or that can be downloaded by User 118 and stored in Memory Device 142 from an application store such as a google transcription engine. User APP Module 150 generally comprises a Create/Edit/Delete Rules Module 152, a Rules Engine Module 154, a Create User/Login Module 156, and an Add Recording and Transmitting Device Module 158. Create/Edit/Delete Rules Module 152 is generally adapted to allow User 118 to create new rules and edit or delete existing rules. Rules Engine Module 154 is generally adapted to examine the initial words of a Transcribed Audio Thought File to determine if they match any of the User's 108 rules as stored in the Rule Database 148, edit the transcription according to corresponding rule and transmit the updated Transcribed Audio Thought File to Recipient 190 using an External Communication Server 106. Create User/Login Module 156 is generally adapted to create an account for a new User 118, specifying Communication Device 140, desire to Sync Audio and Transcribed Thought Files, and other account related information. Transcribed Audio Thought Files 147 is generally adapted to hold Audio Thought Files received by Communication Device 140 from Host Server 110 or the local Transcription Module 149. The Transcribed Thought Files are edited by Rules Engine Module 154 and stored in Audio and Transcribed Thought Database 145. Add Recording and Transmitting Device Module 158 is generally adapted to add Recording and Transmitting Devices 160 and 180 to Communication Device 140 as well as passing paired Recording and Transmitting Devices 180 to Host Server 110. Communication Device 140 further comprises a display screen 141 that is generally adapted to display various aspects of User APP Module 150 such as the home screen, an Audio Thought File, and/or a Transcribed Audio Thought File.

With continued reference to FIG. 1B, Recording and Transmitting Device 160 generally comprises a Central Processing Unit 161, a Microphone 162, a Button 163, Bluetooth® communication hardware 164, and a Memory Device 170. Button 163 is generally provided to start recording of Recording and Transmitting Device 160. Memory Device 170 comprises a Device APP Recording and Transmitting Module 172, a BLE Paring Module 174 and an Audio Thought Files buffer 176. Device APP Recording and Transmitting Module 172 is generally adapted to record an Audio Thought File into Audio Thought Files buffer 176 and transmit an Audio Thought File to Host Server 110. BLE Paring Module 174 is generally adapted to enable Communication Device 140 and Host Server 110 to pair Recording and Transmitting Device 160. Audio Thought Files buffer 176 is generally adapted to hold an Audio Thought File as it is being recorded until sent to Communication Device 140.

With continued reference to FIG. 1, Recording and Transmitting Device 180 generally comprises a Central Processing Unit 182, a Microphone 183, a QR Code 184, Wi-Fi Communication hardware 185, a Button 186 and a Memory Device 181. Button 186 is generally provided to start recording of Recording and Transmitting Device 180. Memory Device 181 is generally adapted to hold the software modules necessary for operation of Recording and Transmitting Device 180. Memory Device 181 further comprises a Device App Recording and Transmitting Module 187, a Device Pairing Module 188, and an Audio Thought Files 189. Device App Recording and Transmitting Module 187 is generally adapted to record an Audio Thought File into Audio Thought Files buffer 187 and transmit it to Host Server 110. Device Provisioning Module 188 is generally adapted to support Communication Device 140 pairing of the device. Recording and Transmitting Device 180 also needs to be connected to a Router 114 to be connected to Internet 108. Router 114 can be any widely available internet Wi-Fi router.

With continued reference to FIG. 1B, Recipient's Communication Device 192 is the same as Communication Device 140 which may or may not contain User APP Module 150. Communication Device 192 also needs to have a Router 115 to be connected to the Internet 108. Router 115 can be any widely available internet Wi-Fi router. Communication Device 192 is controlled by a Recipient 190.

Referring to FIG. 2, wherein a first method and operation of Server Application Module 130 of Host Server 110, User APP Module Software 142 of Communication Device 140 and Recording and Transmitting Device 180 is described.

With continued reference to FIG. 2, as indicated by a start block 201, Device APP Recording and Transmitting Module 187 of Recording and Transmitting Device 180 comprises a set of code adapted to start operation Recording and Transmitting Module 187. Control is passed to block 203 where Device APP Recording and Transmitting Module 187 comprises a set of code adapted to wait for a message such as a command to initiate recording an Audio Thought File. User 118 presses Button 186 on Recording and Transmitting Device 180 (or voice activated) and control is passed to block 205 where Device APP Recording and Transmitting Module 187 comprises a set of code adapted to record an Audio Thought File and save it to Audio Thought File buffer 189. Control is then passed to block 207 where Device APP Recording and Transmitting Module 187 comprises a set of code adapted to Transmit the recorded Audio Thought File via Wi-Fi to the Host Server 110 through Router 114. Control is then passed to block 203 where the app waits for next message.

With continued reference to FIG. 2, as indicated by a start block 230, Audio Receiving Module 132 of Host Server 110 comprises a set of code adapted to start operation of Audio Receiving Module 132 and Server Application Module 130. Control is passed to block 232 where Server Application Module 130 comprises a set of code adapted to wait for a message such as an Audio Thought File. When Host Server 110 receives a message from the Internet 108 control is passed to decisional block 234 where Audio Receiving Module 132 comprises a set of code adapted to determine whether the message is an Audio Thought File. If the message to Host Server 110 is an Audio Thought File control is passed to block 236 where Audio Receiving Module 132 comprises a set of code adapted to send the Audio Thought File to Communication Device 140. Control is passed to decisional block 238 where the Audio Receiving Module 132 comprises a set of code adapted to determine if User 118 who sent the Audio Thought File has Sync Enabled on Host Server 110 for his Audio and Transcribed Thought Files. Syncing Audio and Transcribed Thought Files consists of backing them up on Audio and Transcribed Thought Database 127 of Host Server 110. If Sync is enabled for User 118 control is passed to block 240 where Audio Receiving Module 132 comprises a set of code adapted to save the Audio Thought File in Audio and Transcribed Thought Database 127. Control is then passed to block 232 where Host Server 110 waits for another message. Returning to decisional block 234 if the message is not an Audio Thought File control is passed to decisional block 242 where Audio Receiving Module 132 comprises a set of code adapted to determine whether the message is a Transcribed Audio Thought File. If the message is a Transcribed Audio Thought File control is passed to block 244 where Audio Receiving Module 132 comprises a set of code adapted to Sync Transcribed Thought File by saving it to Audio and Transcribed Thought Database 127. Control is then passed to block 232 where Host Server 110 waits for another message. Returning to decisional block 242 if the message is not a Transcribed Audio Thought File control is then passed to block 232 where Host Server 110 waits for another message.

With continued reference to FIG. 2, as indicated by a start block 210, User APP Module 150 comprises a set of code adapted to start operation of User APP Module 150 Control is passed to block 212 where User APP Module 150 comprises a set of code adapted to wait for a message such as an Audio Thought File. Control is passed to Decisional Block 214 where User APP Module 150 comprises a set of code adapted to determine whether the message is an Audio Thought File. If the message is an Audio Thought File control is passed to block 216 where User APP Module 150 comprises a set of code adapted to record and store the Audio Thought File in the Audio and Transcribed Thought Database 145. Control is then passed to block 217 where User APP Module 150 comprises a set of code to pass the Audio Thought File to Transcription Module 149. Control is then passed to Transcription Module 149 where the Audio Thought File is transcribed into a Transcribed Audio Thought File. Control is then passed to block 154 where User APP Module 150 comprises a set of code adapted to execute Rules Engine Module 154, checking the Transcribed Audio Thought File against all of the rules in the Rule Database 148 (to be described). Control is then passed to decisional block 220 where User APP Module 150 comprises a set of code adapted to determine if the Transcribed Audio Thought File triggers an API Rule. If an API Rule was triggered control is passed to block 222 where User APP Module 150 comprises a set of code adapted to send the Transcribed Audio Thought File to External Communications Server 106 to be sent to the indicated Recipient's Communication Device 192. Control is then passed to decisional block 224 where User APP Module 150 comprises a set of code adapted to determine if User 118 has Server Sync Enabled. If User 118 has Server Sync enabled control is then passed to block 226 where User APP Module 150 comprises a set of code adapted to Sync the Transcribed Audio Thought File by sending it through the internet 108 to Host Server 110. Control is then passed to block 212 where Communication Device 140 waits for another message. Returning to decisional block 220 if the API Rule was not triggered by the message, then control is passed to decisional block 224 where User APP Module 150 comprises a set of code adapted to determine if User 118 has Server Sync Enabled. If User 118 has Server Sync enabled control is then passed to block 226 where User APP Module 150 comprises a set of code adapted to Sync the Transcribed Thought File by sending it through internet 108 to Host Server 110. Control is then passed to block 212 where Communication Device 140 waits for another message. Returning to decisional block 224 if User 118 does not have Server Sync enabled control is then passed to block 212 where Communication Device 140 waits for another message. Although not shown, User APP Module 150 comprises a set of code to display the Audio Thought File and/or the Transcribed Audio Thought File on display screen 141.

Referring to FIG. 3, wherein a second method and operation of Server Application Module 130 of Host Server 110, User APP Module Software 150 of Communication Device 140 and Recording and Transmitting Device 180 is described.

With continued reference to FIG. 3, as indicated by a start block 301, Device APP Recording and Transmitting Module 187 of Recording and Transmitting Device 180 comprises a set of code adapted to start operation of the software. When User 118 presses Button 186 on Recording and Transmitting Device 180 (or voice actuated), control is passed to block 303 where Device APP Recording and Transmitting Module 187 comprises a set of code adapted to wait for a message such as a command to initiate recording an Audio Thought File. Control is passed to block 305 where Device APP Recording and Transmitting Module 187 comprises a set of code adapted to record an Audio Thought File and save it to Audio Thought Files buffer 189. Control is then passed to block 307 where Device APP Recording and Transmitting Module 187 comprises a set of code adapted to Transmit the recorded Audio Thought File via Wi-Fi to Host Server 110 through Router 114. Control is then passed to block 303 where Device APP Recording and Transmitting Module 187 waits for next message.

With continued reference to FIG. 3, as indicated by a start block 310, Audio Receiving Module 132 of Host Server 110 comprises a set of code adapted to start operation of Audio Receiving Module 132 and Server Application Module 130. Control is passed to block 312 where Audio Receiving Module 132 comprises a set of code adapted to wait for a message such as an Audio Thought File. When Host Server 110 receives a message from internet 108 control is passed to decisional block 314 where Audio Receiving Module 132 comprises a set of code adapted to determine whether the message is an Audio Thought File. If the message to Host Server 110 is an Audio Thought File control is passed to block 316 where Audio Receiving Module 132 comprises a set of code adapted to Receive and Store Audio Thought File in Audio and Transcribed Thought File Database 127. Control is passed to block 318 where Audio Receiving Module 132 comprises a set of code adapted to send the Audio Thought File to an internet-based Transcription Service 102. Control is then passed back to block 312 where Host Server 110 waits for another message. Returning to decisional block 314 if the message is not an Audio Thought File control is passed to decisional block 320 where Audio Receiving Module 132 comprises a set of code adapted to determine whether the message is a Transcribed Audio Thought File. If the message to Host Server 110 is a Transcribed Audio Thought File control is passed to block 322 where Audio Receiving Module 132 comprises a set of code adapted to receive and store the Transcribed Audio Thought File in Transcribed Audio Thought File buffer 121. Control is then passed to block 134 where Rules Engine Module 134 comprises a set of code adapted to check the Transcribed Audio Thought File against all of the rules in the Rule Database 125 (to be described). Control is then passed to block 324 where Rules Engine Module 134 comprises a set of code adapted to save the Transcribed Audio Thought File to Audio and Transcribed Thought Database 127. Control is then passed to block 326 where Rules Engine Module 134 comprises a set of code adapted to send the Audio and Transcribed Thought Files to Communication Device 140 through Internet 108. Control is then passed to decisional block 328 where Rules Engine Module 134 comprises a set of code adapted to determine if Transcribed Audio Thought File triggers an API Rule. If an API Rule was triggered control is passed to block 329 where Rules Engine Module 134 comprises a set of code adapted to send Transcribed Audio Thought File to Recipient Communication Device 192 specified in the Transcribed Audio Thought File through the Internet 108 to the External Communication Servers 106. Control is then passed back to block 312 where Host Server 110 waits for another message. Returning to decisional block 320 if the message is not a Transcribed Audio Thought File then control is then passed back to block 312 where Host Server 110 waits for another message. Returning to decisional block 328 if the API Rules were not triggered by the Transcribed Audio Thought File then control is then passed back to block 312 where Host Server 110 waits for another message.

With continued reference to FIG. 3, as indicated by a start block 330, User APP Module 150 of Communication Device 140 comprises a set of code adapted to start operation of User APP Module 150. Control is passed to block 332 where User APP Module 150 comprises a set of code adapted to wait for a message such as an Audio Thought File. When a message is received, control is passed to decisional block 334 where User APP Module 150 comprises a set of code adapted to determine if this is an Audio Thought File. If the message is an Audio Thought File control is passed to block 336 where User APP Module 150 comprises a set of code adapted to save the Audio Thought File to Audio and Transcribed Thought Database 145. Control is then passed to block 332 where Communication Device 140 waits for another message. Returning to decisional block 334, if the message is not an Audio Thought File then control is passed to decisional block 337 where User APP Module 150 comprises a set of code adapted to determine if this is a Transcribed Audio File. If this is a Transcribed Audio File then control is passed to block 338 where User APP Module 150 comprises a set of code adapted to save the Transcribed Audio File to the Audio and Transcribed Thought Database 145. Control is then passed to block 332 where Communication Device 140 waits for another message. Returning to decisional block 337 if the message is not a Transcribed Audio File, control is passed to block 332 where Communication Device 140 waits for another message. Although not shown, User APP Module 150 comprises a set of code to display the Audio Thought File and/or the Transcribed Audio Thought File on display screen 141.

Referring to FIG. 4, wherein a third method and operation of User APP Module 150 of Communication Device 140 and Recording and Transmitting Device 160 is described.

With continued reference to FIG. 4, as indicated by a start block 401, Device APP Recording and Transmitting Module 172 of Recording and Transmitting Device 160 comprises a set of code adapted to start operation of the software. Control is passed to block 403 where Device APP Recording and Transmitting Module 172 comprises a set of code adapted to wait for a message such as a command to initiate recording an Audio Thought File. When User 118 presses Button 163 on Recording and Transmitting Device 160 (or voice activated) control is passed to block 403 where Device APP Recording and Transmitting Module 172 comprises a set of code adapted to wait for a message such as a command to initiate recording an Audio Thought File. Control is passed to block 405 where Device APP Recording and Transmitting Module 172 comprises a set of code adapted to record an Audio Thought File and save it to Audio Thought Files buffer 176. Control is then passed to block 407 where Device APP Recording and Transmitting Module 172 comprises a set of code adapted to transmit the recorded Audio Thought File via Bluetooth® to Communication Device 140. Control is then passed to block 403 where Device APP Recording and Transmitting Module 172 waits for next message.

With continued reference to FIG. 4, as indicated by a start block 410, User APP Module 150 of Communication Device 140 comprises a set of code adapted to start operation of User APP Module 150. Control is passed to block 412 where User APP Module 150 comprises a set of code adapted to wait for a message such as an Audio Thought File. When a message is received, control is passed to decisional block 414 where User App Module 150 comprises a set of code adapted to determine if this is an Audio Thought File Recording. If the message is an Audio Thought File control is passed to block 416 where User App Module 150 comprises a set of code adapted to save the Audio Thought File to Audio and Transcribed Thought Database 145. Control is passed to block 154 where Transcription Module 152 of User App Module 150 comprises a set of code adapted to transcribe the Audio Thought file. Control is passed to block 418 where Transcription Module 152 comprises a set of code adapted to store the Transcribed Audio Thought File into Transcribed Audio Thought File buffer 147. Control is passed to block 154 where Rules Engine Module 154 of User App Module 150 comprises a set of code adapted to check the Transcribed Audio Thought File against all of the rules in Rule Database 148 (to be described). Control is then passed to block 420 where Rules Engine Module 154 comprises a set of code adapted to save the Transcribed Audio Thought File to Audio and Transcribed Thought File Database 145. Control is then passed to decisional block 422 where Rules Engine Module 154 comprises a set of code adapted to check if the API Rules were triggered by the Transcribed Audio Thought File. If the API rules were triggered then control is passed to block 424 where Rules Engine Module 154 comprises a set of code adapted to send the Transcribed Audio Thought File to Recipient's Communication Device through the External Communication Servers 106. Control is then passed to block 412 where Communication Device 140 waits for another message. Returning to decisional block 422 if the message does not trigger the API Rules control is then passed to block 412 where Communication Device 140 waits for another message. Returning to decisional block 414 if the message is not an Audio Thought File Recording control is then passed to block 412 where Communication Device 140 waits for another message.

With continued reference to FIG. 4, the Transcribed Audio Thought File is passed via Internet block 108 to External Communication Servers 106 that are adapted to send the message to Recipient's Communication Device 192. Control is then passed to block 192 where Recipient Communication Device 192 comprises a set of code adapted to receive the Transcribed Audio Transaction File. Although not shown, User APP Module 150 comprises a set of code to display the Audio Thought File and/or the Transcribed Audio Thought File on display screen 141.

Referring to FIG. 5, wherein a fourth method and operation Server Application Module 130 of Host Server 110, User APP Module Software 150 of Communication Device 140, and Recording and Transmitting Device 160 is described.

With continued reference to FIG. 5, as indicated by a start block 501, Device APP Recording and Transmitting Module 172 of Recording and Transmitting Device 160 comprises a set of code adapted to start operation of Recording and Transmitting Module 172 of Recording and Transmitting Device 160. Control is passed to block 503 where Device APP Recording and Transmitting Module 172 comprises a set of code adapted to wait for a message such as a command to initiate recording an Audio Thought File. When User 118 presses, for example, a Button 163 on Recording and Transmitting Device 160 (or voice activated) control is passed to block 505 where Device APP Recording and Transmitting Module 172 comprises a set of code adapted to record an Audio Thought File and save it to Audio Thought Files buffer 176. Control is then passed to block 507 where Device APP Recording and Transmitting Module 172 comprises a set of code adapted to Transmit the recorded Audio Thought File via Bluetooth® to Communication Device 140. Control is then passed to block 503 where Device APP Recording and Transmitting Module 172 waits for next message.

With continued reference to FIG. 5, as shown by a start block 510, User APP Module 150 of Communication Device 140 block 510 comprises a set of code adapted to start operation of User APP Module 150 of Communication Device 140. Control is passed to block 512 where User APP Module 150 comprises a set of code adapted to wait for a message such as an Audio Thought File. When a message is received, control is passed to decisional block 514 where User APP Module 150 comprises a set of code adapted to determine if this is an Audio Thought File. If the message is an Audio Thought File control is passed to block 516 where User APP Module 150 comprises a set of code adapted to save the Audio Thought File to Audio and Transcribed Thought Database 145. Control is then passed to block 517 where User APP Module 150 comprises a set of code adapted to send the Audio Thought File to the Host Server via the Internet 108. Control is then passed to block 512 where Communication Device 140 waits for another message. Returning to decisional block 514 if the message is not an Audio Thought File control is passed to decisional block 518 where User APP Module 150 comprises a set of code adapted to determine if this is a Transcribed Audio Thought File. If the Message is a Transcribed Audio Thought File then control is passed to block 519 where User APP Module 150 comprises a set of code adapted to save the Transcribed Audio Thought File to Audio and Transcribed Thought Database 145. Control is then passed to block 512 where Communication Device 140 waits for another message.

With continued reference to FIG. 5, as indicated by a start block 520, Server Application Module 230 of Host Server 110 comprises a set of code adapted to start operation of Audio Receiving Module 132 and Server Application Module 130 of Host Server 110. Control is passed to block 522 where Server Application Module 130 comprises a set of code adapted to wait for a message such as an Audio Thought File. When Host Server 110 receives a message from the internet 108 control is passed to decisional block 524 where Audio Receiving Module 132 comprises a set of code adapted to determine whether the message is an Audio Thought File. If the message to Host Server 110 is an Audio Thought File control is passed to block 526 where Audio Receiving Module 132 comprises a set of code adapted to receive and store the Audio Thought File in the Audio And Transcribed Thought Database 127. Control is then passed to block 528 where Audio Receiving Module 132 comprises a set of code adapted to send the Audio Thought File to an external Transcription Service though the Internet 108. Control is then passed to block 522 where Server Application Module 130 waits for another message. Returning to decisional block 524 if the message is not an Audio Thought File then control is passed to decisional block 530 where Audio Receiving Module 132 comprises a set of code adapted to determine whether the message is a Transcribed Audio Thought File. If the message is an Audio Thought File then control is passed to block 532 where Server Application Module 130 comprises a set of code adapted to receive and store the Transcribed Audio Thought File into Transcribed Though File buffer 121. Control is passed to block 136 where Rules Engine Module 134 of Server Application Module 130 comprises a set of code adapted to check the Transcribed Audio Thought File against all rules in the Rule Database 125 (to be described). Control is then passed to block 534 where Rules Engine Module 134 of comprises a set of code adapted to save the Transcribed Audio Thought File in the Audio and Transcribed Thought Database 127. Control is then passed to block 536 where Rules Engine Module 134 comprises a set of code adapted to Send the Transcribed Audio Thought File to Communication Device 140 via the Internet 108. Control is then passed to decisional block 538 where Rules Engine Module 134 comprises a set of code adapted to determine whether the API Rules were triggered by the Transcribed Audio Thought File. If the API Rules were triggered control is passed to block 540 where Rules Engine Module 134 comprises a set of code adapted to send the Transcribed Audio Thought File to External Communication Servers 106 to be sent to Recipient Communication Device 192 using the Internet 108. Control is then passed to block 522 where Server Application Module 130 waits for another message. Returning to decisional block 538 if the API Rules were not triggered by the Transcribed Audio Thought File control is then passed to block 522 where Server Application Module 130 waits for another message. Although not shown, User APP Module 150 comprises a set of code to display the Audio Thought File and/or the Transcribed Audio Thought File on display screen 141.

Referring to FIG. 6, wherein a fifth method and operation of User APP Module Software 150 of Communication Device 140 is described.

With continued reference to FIG. 6, as indicated by a start block 601, User App Module 150 of Communication Device 140 comprises a set of code adapted to start operation of User App Module 150. Control is passed to block 603 where User App Module 150 comprises a set of code adapted to wait for input, for example a message to record an Audio Thought File. The message to record an Audio Thought File may be in the form of user 118 depressing a certain key (not shown) of a keypad (not shown) or an icon button of display screen 141 of Communication Device 140 or a voice actuated message from user person 118 into microphone 144 of Communication Device 140. When a message is received, control is passed to decisional block 604 where User APP Module 150 comprises a set of code adapted to determine if the message is a request to record an Audio Thought File. If the message is a request to record an Audio Thought File then control is passed to block 605 where User APP Module 150 comprises a set of code adapted to record and store the Audio Thought File into Audio And Transcribed Thought Database 147 buffer. Control is passed to block 152 where Transcription Module 152 of User App Module 150 comprises a set of code adapted to transcribe the Audio Thought file. Control is passed to block 607 where User APP Module 150 comprises a set of code adapted to save Transcribed Thought File in Transcribed Thought File buffer 147. Control is passed to block 154 where Rules Engine Module 152 comprises a set of code adapted to check Transcribed Audio Thought File 147 against all of the rules in the Rule Database 148 (to be described). Control is then passed to block 609 where User APP Module 150 comprises a set of code adapted to save Transcribed Audio Thought File buffer 147 in the Audio And Transcribed Thought Database 145. Control is then passed to decisional block 611 where User APP Module 150 comprises a set of code adapted to determine if the Transcribed Audio Thought File triggers an API Rule. If an API Rule was triggered control is passed to block 613 where User APP Module 150 comprises a set of code adapted to send Transcribed Audio Thought File using External Communication Server 206 to Recipient Communication Device 192. Control is then passed to block 603 where Communication Device 140 waits for another message. Returning to decisional block 611 if an API Rule wasn't triggered control is passed to block 603 where Communication Device 140 waits for another message. Although not shown, User APP Module 150 comprises a set of code to display the Audio Thought File and/or the Transcribed Audio Thought File on display screen 141.

Referring to FIG. 7, wherein a sixth method and operation of User APP Module Software 150 of Communication Device 140 and Server Application Module 130 of Host Server 110 is described.

With continued reference to FIG. 7, as indicated by a start block 701, User App Module 150 of Communication Device 140 comprises a set of code adapted to start operation of User App Module 150. Control is passed to block 703 where User App Module 150 comprises a set of code adapted to wait for input, for example a message to record an Audio Thought File. When a message is received, control is passed to decisional block 705 where User APP Module 150 comprises a set of code adapted to determine if the message is a request to record an Audio Thought File. If the message is a request to record an Audio Thought File then control is passed to block 707 where User APP Module 150 comprises a set of code adapted to record and store the Audio Thought File into Audio And Transcribed Thought Database 145. Control is passed to block 709 where User APP Module 150 comprises a set of code adapted to Transmit the Audio Thought File via Wi-Fi to Host Server 110. Control is then passed to block 703 where Communication Device 140 waits for another message.

With continued reference to FIG. 7, as indicated by a start block 720, Server Application Module 230 of Host Server 110 comprises a set of code adapted to start operation of Audio Receiving Module 132 and Server Application Module 130 of Host Server 110. Control is passed to block 722 where Server Application Module 130 comprises a set of code adapted to wait for a message such as an Audio Thought File. When Host Server 110 receives a message from the internet 108 control is passed to decisional block 724 where Audio Receiving Module 132 comprises a set of code adapted to determine whether the message is an Audio Thought File. If the message to Host Server 110 is an Audio Thought File control is passed to block 726 where Audio Receiving Module 132 comprises a set of code adapted to receive and store the Audio Thought File in Audio and Transcribed Thought File Database 127. Control is passed to block 728 where Audio Receiving Module 132 comprises a set of code adapted to send the Audio Thought File to Voice Transcription Service 102 using the internet 108. Control is passed to block 722 where Host Server 110 waits for another message. Returning to decisional block 724 if the message is no an Audio Thought File then control is passed to decisional block 730 where Audio Receiving Module 132 comprises a set of code adapted to determine whether the message is an Transcribed Audio Thought File. If the message is a Transcribed Audio Thought File control is passed to block 732 where Audio Receiving Module 132 comprises a set of code adapted to receive and store Transcribed Audio Thought File in the Audio and Transcribed Thought File buffer 121. Control is passed to block 134 where Rules Engine Module 134 comprises a set of code adapted to check the Transcribed Audio Thought File against all of the rules in the Rule Database 148 (to be described). Control is then passed to block 734 where Rules Engine Module 134 comprises a set of code adapted to save the Transcribed Audio Thought File to Transcribed Audio Thought File buffer 121 to Audio and Transcribed Thought File Database 127. Control is then passed to block 736 where Rules Engine Module 134 comprises a set of code adapted to send Transcribed Audio Thought File to Communication Device 140 via Internet 108. Control is then passed to decisional block 738 where Rules Engine Module 134 comprises a set of code adapted to determine whether the API Rules were triggered by the Transcribed Audio Thought File. If the API rules were triggered, then control is passed to block 740 where Rules Engine Module 134 comprises a set of code adapted to send the Transcribed Audio Thought File to Recipient's Communication Device 192 through the External Communication Servers 106. Control is then passed to block 722 where Communication Device 140 waits for another message. Returning to decisional block 730 if the message is not a Transcribed Audio File control is then passed to block 722 where Communication Device 140 waits for another message. Returning to decisional block 738 if the message does not trigger the API Rules control is then passed to block 722 where Communication Device 140 waits for another message. Although not shown, User APP Module 150 comprises a set of code to display the Audio Thought File and/or the Transcribed Audio Thought File on display screen 141.

Referring to FIG. 8, wherein the operation of Create/Edit/Delete Rules Module 155 and Rules Engine Module 134 of User APP Module 150 of Communication Device 140 are described.

With continued reference to FIG. 8, as indicated by a start block 802, User APP Module 150 of Communication Device 140 comprises a set of code adapted to start operation of User APP Module 150. Control is passed to block 804 where User APP Module 150 comprises a set of code adapted to wait for input, for example a message to create a Rule. When a message is received, control is passed to decisional block 806 where User APP Module 150 comprises a set of code adapted to determine if the message is a request to create a new Rule. If the message is a request to create a new Rule, then control is passed to block 808 where Create/Edit/Delete Rules Module 155 comprises a set of code adapted to allow the User 118 to select Integration for the new Rule. Control is passed to block 810 where Create/Edit/Delete Rules Module 155 comprises a set of code adapted to allow the User 118 to select Destination for the new Rule. Control is passed to block 812 where Create/Edit/Delete Rules Module 155 comprises a set of code adapted to allow the User 118 to select Link for the new Rule. Control is passed to block 814 where Create/Edit/Delete Rules Module 155 comprises a set of code adapted to build the new rule in Edit Rule buffer 816 from the User 118 selected Integration, Destination and Link. Control is passed to block 817 where Create/Edit/Delete Rules Module 155 comprises a set of code adapted to save the new Rule to the Rule Database 148 and send the new Rule to the Host Server 110 to be added to the Host Server 110 Rule Database 125 (reference FIG. 14a). Control is then passed to block 804 where Communication Device 140 waits for another message. Returning to decisional block 806 if the message is not request to create a rule, control is passed to decisional block 818 where Create/Edit/Delete Rules Module 155 comprises a set of code adapted to determine if the message is a request to edit or delete a rule. If the message is a request to edit or delete a rule control is passed to block 820 where Create/Edit/Delete Rules Module 155 comprises a set of code adapted to select a rule from the Rule Database 148 and save in the Rule buffer 816. Control is then passed to decisional block 822 where Create/Edit/Delete Rules Module 155 comprises a set of code adapted to determine if the message is a request to delete a rule. If the message is a request to delete a rule, control is passed to block 824 where Create/Edit/Delete Rules Module 155 comprises a set of code adapted to delete the selected Rule from Rule Database 148 and from Rule Database 125. Control is then passed to block 804 where Communication Device 140 waits for another message. Returning to decisional block 822 if the message is not a request to delete rule then control is passed to block 826 where Create/Edit/Delete Rules Module 155 comprises a set of code adapted to edit the rule content of the selected Rule. Control is then passed to block 828 where Create/Edit/Delete Rules Module 155 comprises a set of code adapted to update the selected Rule in Rule Database 148 and send update Rule request to Host Server 110 to update Rule Database 125. Control is then passed to block 804 where Communication Device 140 waits for another message.

With continued reference to FIG. 8, as indicated by a block 605, User APP Module 150 of Communication Device 140 comprises a set of code adapted to receive and store the Transcribed Audio Thought File in Transcribed Audio Thought File buffer 147 (reference FIG. 15). Control is then passed to decisional block 832 where Rules Engine Module 154 of Communication Device 140 comprises a set of code adapted to determine if the first word in the Transcribed Audio Thought File is a defined integration described in one or more of the Rules in User Rule Database 148. If first word is an integration in one or more rules, then control is passed to block 834 where Rules Engine Module 154 comprises a set of code adapted to determine if the following phrase in the Transcribed Audio Thought File buffer 147 is a matching destination for one of the rules previously selected. If the next phrase is a matching destination for one of the rules control is passed to block 836 where Rules Engine Module 154 comprises a set of code adapted to mark or update the Transcribed Audio Thought File with an API Tag and store the updated Transcribed Audio Thought File in Transcribed Audio Thought File buffer 147. Control is then passed to block 838 where Rules Engine Module 154 comprises a set of code adapted to save the updated Transcribed Audio Thought File to Transcribed Audio Thought File database 145 (reference FIG. 16). Control is then passed to block 840 where Rules Engine Module 154 comprises a set of code adapted to send the Transcribed Audio Thought File to Recipient Communication Device 192 using External Communication Servers 106 according to the API of the selected rule. Control is passed to block 603 where Communication Device 140 waits for another message. Returning to decision block 834 if the next phrase in the Transcribed Thought File does not have a matching destination for any Rule in Rule Database 148 then control is passed to block 844 where Rules Engine Module 154 comprises a set of code adapted to mark the Transcribed Audio Thought File with an error. Control is then passed to block 846 where Rules Engine Module 154 comprises a set of code adapted to save the marked or updated Transcribed Audio Thought File Control in Audio and Transcribed Thought Database 148. Control is passed to block 603 where Communication Device 140 waits for another message.

Referring to FIG. 9, wherein the operation of Create/Edit/Delete Rules Module 152 of User APP Module 150 of Communication Device 140 and Rules Engine Module 134 of Host Server 110 are described.

With continued reference to FIG. 9, as indicated by a start block 902, User APP Module 150 of Communication Device 140 comprises a set of code adapted to start operation of User APP Module 150. Control is passed to block 904 where User APP Module 150 comprises a set of code adapted to wait for input, for example, a message to create a Rule. When a message is received, control is passed to decisional block 906 where User APP Module 150 comprises a set of code adapted to determine if a request to create a new Rule. If request to create new Rule, then control is passed to block 908 where Create/Edit/Delete Rules Module 155 comprises a set of code adapted to allow the User 118 to select Integration for the new Rule. Control is passed to block 910 where Create/Edit/Delete Rules Module 155 comprises a set of code adapted to allow the User 118 to select Destination for the new Rule. Control is passed to block 912 where Create/Edit/Delete Rules Module 155 comprises a set of code adapted to allow the User 118 to select Link for the new Rule. Control is passed to block 914 where Create/Edit/Delete Rules Module 155 comprises a set of code adapted to build the new rule in Edit Rule buffer 915 from the User 118 selected Integration, Destination and Link. Control is passed to block 916 where Create/Edit/Delete Rules Module 155 comprises a set of code adapted to save the new Rule to the Rule Database 148 (reference FIG. 14b). Control is passed to block 917 where Create/Edit/Delete Rules Module 155 comprises a set of code adapted to send the new Rule to the Host Server 110 to be added to Rule Database 125 of Host Server 110. Control is then passed to block 904 where Communication Device 140 waits for another message. Returning to decisional block 906, if the message is not request to create a rule then control is passed to decisional block 918 where Create/Edit/Delete Rules Module 155 comprises a set of code adapted to determine if the message is a request to edit or delete a rule. If the message is a request to edit or delete a rule control is passed to block 920 where Create/Edit/Delete Rules Module 155 comprises a set of code adapted to select a rule from Rule Database 148 and save in Rule buffer 915 (same Rule buffer used previously). Control is then passed to decisional block 922 where Create/Edit/Delete Rules Module 155 comprises a set of code adapted to determine if the message is a request to delete a rule. If the message is a request to delete a rule then control is passed to block 924 where Create/Edit/Delete Rules Module 155 comprises a set of code adapted to delete the selected rule from Rule Database 148. Control is passed to block 917 where Create/Edit/Delete Rules Module 155 comprises a set of code adapted to send a message to Host Server 110 to delete the rule in Rule Database 125. Control is then passed to block 904 where Communication Device 140 waits for another message. Returning to decisional block 922, if the message is not a request to delete a rule then control is passed to block 826 where Create/Edit/Delete Rules Module 155 comprises a set of code adapted to edit the content of the selected Rule. Control is then passed to block 928 where Create/Edit/Delete Rules Module 155 comprises a set of code adapted to update the selected rule in Rule Database 148 and send the updated rule to Rule Database 125 of Host Server 110. Control is passed to block 917 where Create/Edit/Delete Rules Module 155 comprises a set of code adapted to send message to Host Server 110 to update the Rule on Rule Database 125. Control is then passed to block 804 where Communication Device 140 waits for another message.

With continued reference to FIG. 9, as indicated by a start block 950, Server Application Module 230 of Host Server 110 comprises a set of code adapted to start operation of Server Application Module 130. Control is passed to block 952 where Server Application Module 130 comprises a set of code adapted to wait for a message such as Save Rule Changes to Rule Database 125. When Host Server 110 receives a message from the internet 108 control is passed to decisional block 954 where Server Application Module 130 comprises a set of code adapted to determine if the message is a request to Save Rule Changes to Rule Database 125. Control is passed to decisional block 956 where Server Application Module 130 comprises a set of code adapted to save the Rule to the Rule buffer 958. Control is passed to block 960 where Server Application Module 130 comprises a set of code adapted to save the Rule in the Rule Database 125. Returning to decisional block 954, if the message is not a request to Save Rule Changes to Rule Database 125 control is passed to decisional block 962 where Server Application Module 130 comprises a set of code adapted to determine if the message is a Transcribed Audio Thought File. If the message is a Transcribed Audio Thought File, control is passed to block 964 where Server Application Module 130 comprises a set of code adapted to receive and store the Transcribed Audio Thought File in Transcribed Audio Thought File buffer 121 (reference FIG. 15). Control is passed to decisional block 966 where Rules Engine Module 134 of Server Application Module 130 of Host Server 110 comprises a set of code adapted to determine if the first word in the Transcribed Audio Thought File is a defined integration described in one or more of the Rules in User Rule Database 125. If the first word is an integration in one or more rules, then control is passed to decisional block 968 where Rules Engine Module 134 comprises a set of code adapted to determine if the following phrase in the Transcribed Audio Thought File buffer 121 is a matching destination for one of the rules previously selected. If the next phrase is a matching destination for one of the rules control is passed to block 970 where Rules Engine Module 134 comprises a set of code adapted to mark or update the Transcribed Audio Thought File with an API Tag and store the updated Transcribed Audio Thought File in Transcribed Audio Thought File buffer 121. Control is then passed to block 972 where Rules Engine Module 134 comprises a set of code adapted to save the updated Transcribed Audio Thought File to Transcribed Audio Thought File database 125 (reference FIG. 16). Control is then passed to block 974 where Rules Engine Module 134 comprises a set of code adapted to send the Transcribed Audio Thought File to Recipient's Communication Device 192 using External Communication Servers 106 according to the API of the selected rule. An alternative method not shown is to perform on Communication Device 140 functions such as adding the message to a folder or adding an item to a different task management application on Communication Device 140. Control is passed to block 950 where Host Server 110 waits for another message. Returning to decision block 968 if the next phrase in the Transcribed Thought File does not have a matching destination for any rule in Rule Database 148 then control is passed to block 976 where Rules Engine Module 134 comprises a set of code adapted to mark the Transcribed Audio Thought File with an error. Control is passed to block 978 where Rules Engine Module 134 comprises a set of code adapted to save the marked Transcribed Audio Thought File to Rule Database 125. Control is passed to block 980 where Rules Engine Module 134 comprises a set of code adapted to send the marked Transcribed Audio Thought File to Communication Device 140 through the internet 108. Control is passed to block 950 where Host Server 110 waits for another message. Returning to decision block 966, if the first word in the Transcribed Audio Thought File is not a defined integration described in one or more of the Rules in User Rule Database 125 control is passed to control block 982 where Rules Engine Module 134 comprises a set of code adapted to save Transcribed Audio Thought File to Audio and Transcribed Thought File Database 127. Control is passed to block 984 where Rules Engine Module 134 comprises a set of code adapted to Send Transcribed Audio Thought File to Communication Device 140 using the Internet 108. Control is passed to block 950 where Host Server 110 waits for another message.

Referring to FIG. 10, wherein the operation of Add Recording and Transmitting Device Module 158 of User APP Module 150 and Device Provisioning Module 188 of Recording and Transmitting Device 180 and Add Recording and Transmitting Device Module 131 of Server Application Module 130 of Host Server 110 are described.

With continued reference to FIG. 10, as indicated by a start block 1030, Add Recording and Transmitting Device Module 158 of Communication Device 140 comprises a set of code adapted to start operation of Add Recording and Transmitting Device Module 158. Control is passed to block 1032 where Add Recording and Transmitting Device 158 comprises a set of code adapted to wait for input, for example, a message to add a Recording and Transmission Device. When a message is received, control is passed to decisional block 1034 where Add Recording and Transmitting Device Module 158 comprises a set of code adapted to determine if a request to Add Recording and Transmitting Device Module. If request to Add Recording and Transmitting Device Module, then control is passed to block 1036 where Add Recording and Transmitting Device Module 158 comprises a set of code adapted to scan Recording and Transmitting Device QR Provisioning Code 184. Control is passed to block 1038 where Add Recording and Transmitting Device Module 158 comprises a set of code adapted to derive the Wi-Fi communication protocol from Recording and Transmitting Device QR Provisioning Code 184, then open the communication channel using these parameters. Control is passed to block 1040 where Add Recording and Transmitting Device Module 158 comprises a set of code adapted to derive the MAC address of the Recording and Transmitting Device 180 from the QR code. Control is passed to block 1042 where Add Recording and Transmitting Device Module 158 comprises a set of code adapted to send SSID name and password for local Wi-Fi network to the Recording and Transmitting Device 180. Control is then passed to block 1030 where Communication Device 140 waits for another message. Returning to block 1034 if the message is not add new Recording and Transmitting Device control is passed to block 1030 where Communication Device 140 waits for another message.

With continued reference to FIG. 10, as indicated by a start block 1002, Device Provisioning Module 188 of Recording and Transmitting Device 180 comprises a set of code adapted to start operation of Device Provisioning Module 188. Control is passed to block 1004 where Device Provisioning Module 188 comprises a set of code adapted to wait for input, for example, a message containing Wi-Fi protocol for communication with the local Wi-Fi router. When input occurs control is passed to decisional block 1006 where Device Provisioning Module 188 comprises a set of code adapted to determine if message contains Wi-Fi protocol for communication with the local Wi-Fi router. If the message contains Wi-Fi protocol for communication control is passed to block 1008 where Device Provisioning Module 188 comprises a set of code adapted to use the passed Wi-Fi protocol to connect to the Internet 108 and save the internet protocol to the Internet Protocol buffer 1010. Control is passed to block 1012 where Device Provisioning Module 188 comprises a set of code adapted to send a message "Ready to be claimed" to the Host Server 110. Control is passed to block 1008 where Recording and Transmitting Device 180 waits for another message. Returning to block 1006 if message is not Wi-Fi protocol for local Wi-Fi network then control is passed to block 1008 where Recording and Transmitting Device 180 waits for another message.

With continued reference to FIG. 10, as indicated by a start block 1020, Server Application Module 130 of Host Server 110 comprises a set of code adapted to start operation of Server Application Module 130. Control is passed to block 1022 where Server Application Module 1030 comprises a set of code adapted to wait for input for example, receiving both "Ready to be claimed" and "Claiming messages". When input occurs control is passed to decisional block 1026 where Add New Recording and Transmitting Device Module 131 comprises a set of code adapted to determine if messages "Ready to be Claimed" from Recording and Transmitting Device 180 and "Claiming Device" from Communication Device 140 have been received. If messages "Ready to be Claimed" and "Claiming Device" have been received control is passed to block 1028 where Add New Recording and Transmitting Device Module 131 comprises a set of code adapted to save link between the Recording and Transmitting Device 180 MAC Address and User ID from Communication Device 140 in the Device Database 126. Control is then passed to block 1020 where Host Server 110 waits for another message. Returning to block 1026 if messages "Ready to be Claimed" and "Claiming Device" have not been received control is passed to block 1020 where Host Server 110 waits for another message.

Referring to FIG. 11, wherein the operation of Add Recording and Transmission Module 158 of User APP Module 150 of BLE Paring Module 174 of Recording and Transmission Device 160 are described.

With continued reference to FIG. 11, as indicated by a start block 1102, User APP Module 150 of Communication Device 140 comprises a set of code adapted to start operation of User APP Module 150. Control is passed to block 1104 where User APP Module 150 comprises a set of code adapted to wait for input, for example, a message to Add a New Recording and Transmitting Device—Bluetooth®. When a message is received, control is passed to decisional block 1108 where User APP Module 150 comprises a set of code adapted to determine if the message is a request to Add a New Recording and Transmitting Device. If the message is a request to Add a New Recording and Transmitting Device, then control is passed to block 1110 where Add Recording and Transmitting Device Module 155 comprises a set of code adapted to Use BLE Paring protocol to exchange Bluetooth® pairing information with Recording and Transmitting Device 160. Control is passed to block 1112 where Add Recording and Transmitting Device Module 155 comprises a set of code adapted to save Recording and Transmitting Device 160 MAC address, ID and Bluetooth® pairing information in Device Database 146. Control is passed to block 1104 where Communication Device 140 waits for another message.

With continued reference to FIG. 11, as indicated by a start block 1120, BLE Pairing Module 1174 of Recording and Transmitting Device 160 comprises a set of code adapted to start operation of BLE Pairing Module 174. Control is passed to block 1122 where BLE Pairing Module 174 comprises a set of code adapted to wait for input, for example, a message containing Wi-Fi protocol for communication with the local Wi-Fi router. When input occurs control is passed to decisional block 1124, where BLE Pairing Module 174 comprises a set of code adapted to determine if the message is BLE Pairing information from Communication Device 140. If the message contains BLE Pairing information for Bluetooth® communication control is passed to block 1126, where BLE Pairing Module 174 comprises a set of code adapted to receive Communication Device 140 Bluetooth® Pairing information. Control is passed to block 1128 where BLE Pairing Module 174 comprises a set of code adapted to save Communication Device 140 Bluetooth® Pairing information to Bluetooth® Pairing Information buffer 1128 of Communication Device 140. Control is passed to block 1122 where Recording and Transmitting Device 160 waits for another message. Returning to decision block 1124 if the message doesn't contain BLE Pairing information for Bluetooth® communication control is passed to block 1122 where Recording and Transmitting Device 160 waits for another message.

Referring to FIG. 12, wherein the operation of Create User/Login Module 156 of User APP Module 150 and of Create User/Login Module 135 of Host Server 110 are described.

With continued reference to FIG. 12, as indicated by a start block 1200, User APP Module 150 of Communication Device 140 comprises a set of code adapted to start operation of User APP Module 150. Control is passed to block 1202 where User APP Module 150 comprises a set of code adapted to wait for input, for example, a message to create a new account from User 118. When a message is received by block 1202, control is passed to decisional block 1204 where Create User Module 156 comprises a set of code adapted to determine if it is a request User 118. If it is a request from User 118, then control is passed to block 1206 where Create User Module 156 comprises a set of code adapted to request User 118 to input his/or User Name. Control is passed to block 1206 where Create User Module 156 comprises a set of code adapted to asked User 118 whether or not he/she wishes to Sync (store backup copies of Audio and Transcribed Thought Files on Host Server 110). Control is passed to block 1208 where Create User Module 156 comprises a set of code adapted to ask User 118 whether he/she wants transcription of Audio Thought Files performed by Host Server 110 using an external Voice Transcription Service 102 or on the Communication Device 140 using local Transcription Module 149. Control is passed to block 1210 where Create User Module 156 comprises a set of code adapted to save the data of User 118 to User Database 149. Control is passed to block 1212 where Create User Module 156 comprises a set of code adapted to send the date of User 118 to Host Server 110 to be saved into User Database 124. Control is passed to block 1202 where User APP Module waits for another message. Returning to decisional block 1204 if the request is not to create a new user then Control is passed to block 1202 where User APP Module 150 waits for another message.

With continued reference to FIG. 12, as indicated by a start block 1221, Server Application Module 130 comprises a set of code adapted to start operation of Server Application Module 130. Control is passed to block 1223 where Server Application Module 130 comprises a set of code adapted to wait for input, for example, a request to create User 118. Control is passed to decisional block 1225 where Create User Module 135 comprises a set of code adapted to determine if this is a request to create a new user. If the request is to create a new user such as User 118, then control is passed to block 1227 where Create User Module 135 comprises a set of code adapted to receive date of the new user from Communication Device 140. Control is passed to block 1229 where Create User Module 135 comprises a set of code adapted to store the date of the new user in User Database 124. Control is passed to block 1223 where Server Application Module waits for another message. Returning to decisional block 1225 if the request is not to create a new user control is passed to block 1223 where Server Application Module waits for another message.

Referring to FIG. 13A, wherein the contents of User Database 124 of Host Server 110 are described. User Database 124 has three fields, the User ID that is created when a new user account is created, an email address that is input by the User 118 and the user's account levels based on the features purchased. The User ID is used to get User 118 specific data from all server databases and used in communication with any Recording and Transmitting Device 160. The email address is used for log-in and communications. The Groups are used to determine actions reserved for advanced features. One example being Sync that indicates whether the User 118 has selected to back up the Communication Device 140 the Audio and Transcribed Thought File Database 145 on Host Server 110 and Transcribed Thought File Database 127 of Communication Device 140. Another being Host Transcription that indicates whether the transcription of the Audio Thought File will take place on Host Server 110 (through external Voice Transcription Service 102) or on Communication Device 140.

Referring to FIG. 13B, wherein the contents of Device Database 126 of Host Server 110 are described. Device Database 126 has four fields. The User ID as described in 124, the MAC Address of the device, the Device Name that is given by the User 118, and Last Modified. Last Modified is used to determine if the user has made any changes to the device settings.

Referring to FIG. 14A, wherein contents of Rule Database 125 of Host Server 110 are described. Each Rule in Rule Database 125 was created by User 118 created rules to determine how to treat Transcribed Audio Thought Files. Each Rule has four fields: User, Integration, Destination and Address. User indicates which User the specific rule is for (so that User 118 Audio Thought File will only be tested for a match against the rules created by User 118). Integration is the specific type of communication protocol to be used to send the Transcribed Audio Thought file. Destination is the name of the Person the system will send the Transcribed Thought File. Address is the specific link data used with the Integration selection to send Transcribed Audio Thought File. For example, in Rule 1401 Transcribed Audio Thought File 1602 will be emailed to Recipient 190, namely, Erik using ekaiser@glamcor.com as the email address. Examples of how Transcribed Audio Thought buffer is changed by the Rules Engine Module 134 are demonstrated by FIG. 15 and FIG. 16 (described hereinafter).

Referring to FIG. 14B, wherein contents of Rule Database 148 of Communication Device 140 are described. Each Rule in Rule Database 148 was created by User 118 to determine how to treat Transcribed Audio Thought Files. Each Rule has three fields: Integration, Destination and Address. Integration is the specific type of communication protocol to be used to send the Transcribed Audio Thought file. Destination is the name of the Person the system will send the Transcribed Audio Thought File. Address is the specific link data used with the Integration selection to send Transcribed Audio Thought File.

For example, in Rule 1411 Transcribed Audio Thought File 1602 will be emailed to Recipient 190, namely, Erik using ekaiser@glamcor.com as the email address. Examples of how Transcribed Audio Thought buffer is changed by the Rules Engine Module 154 are demonstrated by FIG. 15 and FIG. 16 (described hereinafter).

Referring to FIG. 15, wherein sample contents of Transcribed Audio Thought buffer 121 on Host Server 110 and Transcribed Audio Thought buffer 147 on Communication Device 140 are described. Data items 1501 and 1502 are transcribed audio files from User 118.

Referring to FIG. 16, wherein sample contents of Transcribed Audio Thought buffer 121 on Host Server 110 and Transcribed Audio Thought buffer 147 on Communication Device 140 after they are updated by the Rules Engine Module 134 on Host Server 110 and Rules Engine Module 148 on Communication Device 140 are described. The contents of Transcribed Audio Thought buffer on both devices is substantially identical and only the data buffer on Host Server 110 will be described. Rules Engine Module 134 on Host Server 110 compare the contents of the data buffer against each rule User 118 created. In data entry 1501 buffer text "Slack Erik I have a new idea for the Server" is found to match rule 1402, namely, "User 1 | Slack | Erik | @Erik A. Kaiser" Rules Engine 134 edits the buffer text based on the rule to change data entry 1601, namely "#Slack @Erik A. Kaiser I have a new idea for the Server". In the example of item 1601, the updated buffer is transmitted to Recipient 192 on Recipient Communication Device 192 via Slack using Slack address @Erik A. Kaiser. As further shown, data entry 1502 buffer text "Email Erik From Work Let's meet today" is found to match rule 1401, namely, "User 1 | Email | Erik ekaiser@glamcor.com". Rules Engine 134 edits the buffer text based on the rule to change data entry 1602 to "#Email ekaiser@glamcor.com let's meet today". In the example of item 1601, the updated buffer is transmitted to Recipient 192 on Recipient Communication Device 192 via Slack using Slack address @Erik A. Kaiser. In the example of item 1602, the updated buffer is transmitted to Recipient 192 on Recipient Communication Device 192 via email using email address ekaiser@glamcor.com.

Referring to FIG. 17A and FIG. 17B, the present invention is a system 1700 that is based on the configuration presented in the system of FIG. 1A and FIG. 1B. The description below are only for those features that have been changed from the configuration of the system of FIG. 1A and FIG. 1B. System 1700 generally comprises Host Server 110 comprising Central Processing Unit 112, Memory Device 120, a Database Module 1722 stored on Memory Device 120, and a Server Application Module 1730 stored on a Memory Device 120. System 1700 further comprises an APP Module 1704 that can be downloaded over an internet 108 by person (User) 118 to his or her Communication Device 140. System 1700 is generally adapted so user 118 can easily record an Audio Thought File from one or more Recording and Transmitting Devices 1760 controlled by person 118 and transmit or send the Audio Thought File to Host Server 110 which then transmits it to Communication Device 140 for transcription to a Transcribed Audio Thought File. Thereafter, the Transcribed Audio Thought File is sent with or without an attached media file to an External Communication Server 106 (such as Email, SLACK or text) that sends the Transcribed Audio Thought File with or without an attached media file to Communication Device 192 of a different person or Recipient 190.

Referring to FIG. 17A, Database Module 1722 is generally adapted to contain all of the different data bases used in connection with Server Application Module 1730. Database Module 1722 generally comprises a User Database 124, a Rule Database 125, a Device Info Database 1727, an Audio Recordings Database 1726, a Transcription Database 1729, and a Folder Database 1728. User Database 124 is generally adapted to store information of user 118 that has downloaded User APP Module 1704 and signed into Host Server 110. Device Info Database 1727 is generally adapted to store information of Recording and Transmitting Device 1760 that have been added by user 118. Audio Recordings Database 1726 is generally adapted to store Audio Thought Files recorded by user 118 on Communication Device 140 or Recording and Transmitting Device 1760. Transcription Database 1729 is generally adapted to store a Transcribed Audio Thought File recorded by user 118 on Communication Device 140 or Recording and Transmitting Device 1760.

With continued reference to FIG. 17A, Server Application Module 1730 is generally adapted to receive Audio and Transcribed Thought Files, and store copies of them in the Audio Recordings Database 1726 and Transcriptions Database 1729 as well as store lists of users in User Database 124, their devices in the Device Info Database 1727 and rules they have defined in the Rule Database 125. Server Application Module 1730 comprises an Add New Recording and Transmitting Device Module 1731, Audio Receiving Module 132, Transaction Request Module 133, Rules Engine Module 134, Create User Module 135, a Device Pairing Module 1736 and Transcribed Audio Thought Buffer 121. Add New Recording and Transmitting Device Module 1731 is generally provided to add new Recording and Transmitting Device Module 1760. Device Pairing Module 1736 is generally adapted to establish communication with the Communication Device 140 of User 118.

Referring to FIG. 17B, Communication Device 140 generally comprises Display Screen 141, Central Processing Unit 143, Microphone 144, Memory Device 142 and communication Radio 1748. Communication Device 140 further comprises a User APP Module 1750 stored on Memory Device 142. As will be described more fully herein, User APP Module 1750 is generally adapted to hold all of the application modules that execute the application specific software associated with User APP Module 1750. Communication Device 140 further comprises a User Data Module 1782 that comprises a Folders Database 1788, an Audio Recording Database 1785 and a Transcription Database 1786 created by User APP Module 1750 and stored on Memory Device 142. Audio Recordings Database 1785 is generally adapted to store an Audio Thought File recorded by user 118 on Communication Device 140 or Recording and Transmitting Device 1760. Transcription Database 1786 is generally adapted to store a Transcribed Audio Thought File of the Audio Thought File. Communication Device 140 further comprises a Device Info Database 1784 created by User APP Module 1750 and stored on Memory Device 142. Device Info Database 1784 is generally adapted to store information of Recording and Transmitting Devices 1760 that have been added by user 118. Communication Device 140 further comprises Rules Database 178 created by User APP Module 1750 and stored on Memory Device 142. Communication Device 140 further comprises a Transcribed Audio Thought Files buffer 147 created by User APP Module 1750. Transcribed Audio Thought Buffer 147 is generally adapted to hold an Audio Thought File when recorded by Communication Device 140 or received from Recording and Transmitting Device 1760. Communication Device 140 further comprises Transcription Module 149 that is generally adapted to transcribe an Audio Thought File.

With continued reference to FIG. 17B, User APP Module 1750 generally comprises a Device Pairing Module 1751, a Folders Module 1752, a Media Module 1753, Create/Edit/Delete Rules Module 152, Rules Engine Module 154, Create User/Login Module 156, and an Add Recording and Transmitting Device Module 1758. Device Pairing Module 1751 is generally adapted to allow User 118 to establish communication with Recording and Transmitting Device 1760 as well as providing Wi-Fi communication protocol for Host Server 110. Folders Module 1752 is generally adapted to allow User 118 to create folders on Folders database 1788 as well as store transactions in the created folders. Media Module 1753 is generally adapted to allow User 118 to edit as well as attach a media file from Media Database 1790 to a previously created Transcribed Audio Thought File. Add Recording and Transmitting Device Module 1758 is generally adapted to generally to add one or more Recording and Transmitting Device 1760 to Communication Device 140 as well as passing newly paired Recording and Transmitting Devices 1760 to Host Server 110. Communication Device 140 further comprises display screen 141 that is generally adapted to display various aspects of User APP Module 1750 such as the home screen, a list of Transcribed Audio Thought Files, and/or a Transcribed Audio Thought File.

With continued reference to FIG. 17B, Recording and Transmitting Device 1760 generally comprises a Central Processing Unit 1761, a Microphone 1762, a Button 1763, a Radio Communication Device 1764, and a Memory Device 1781. Central Processing Unit 1761 and Microphone 1762 are well known in the art and widely available. Button 1763 is generally provided to start recording of Recording and Transmitting Device 1760. Radio Communication Device 1764 comprises all of the hardware to provide Bluetooth® or WiFi communication with Host Server 110 and Communication Device 140. Radio Communication Device 1764 is well known in the art and is widely available, for example, as part of an Espressif SoC. Recording and Transmitting Device 1760 further comprises a Device APP Recording and Transmitting Module 1772 stored on Memory Device 1781. Recording and Transmitting Device 1760 further comprises a Device Paring Module 1774 stored on Memory Device 1781. Recording and Transmitting Device 1760 further comprises an Audio Thought Files Buffer 1794 and a Communications Protocol Buffer 1778. Device APP Recording and Transmitting Module 1772 is generally adapted to record an Audio Thought File into Audio Thought Files Buffer 1794 and transmit an Audio Thought File to Host Server 110 via WiFi. Device Paring Module 1774 is generally adapted to enable Communication Device 140 and Host Server 110 to pair Recording and Transmitting Device 1760 for Bluetooth® communication to Communication Device 140. Audio Thought Files Buffer 1794 is generally adapted to hold an Audio Thought File as it is being recorded until sent to Host Server 110 or Communication Device 140. Communications Protocol Buffer 1778 is generally adapted to hold Bluetooth® and Wi-Fi communications protocol to enable communication between Recording and Transmitting Device 1760 and Communication Device 140 or Host Server 110.

Referring to FIG. 18A and FIG. 18B, wherein a method and operation of Server Application Module 1730 of Host Server 110, User APP Module 1750 of Communication Device 140, and Device APP Recording and Transmitting Module 1772 of Recording and Transmitting Device 1760 are described.

Referring to FIG. 18A as indicated by a start block 1801, Device APP Recording and Transmitting Module 1772 of Recording and Transmitting Device 1770 comprises a set of code adapted to start operation of Recording and Transmitting Module 1772 by, for example, depression of button 1763. Control is passed to block 1803 where Device APP Recording and Transmitting Module 1772 comprises a set of code adapted to wait for a message such as a command to initiate recording an Audio Thought File. User 118 presses button 1763 on Recording and Transmitting Device 1770 (or voice activated) and control is passed to block 1805. As shown by block 1805, Device APP Recording and Transmitting Module 1772 comprises a set of code adapted to record an Audio Thought File and save it to Audio Thought File Buffer 1794. Control is then passed to block 1807 where Device APP Recording and Transmitting Module 1772 comprises a set of code adapted to transmit the recorded Audio Thought File via Wi-Fi to Host Server 110 through router 117. Although not shown, Device APP Recording and Transmitting Module 1772 may also be adapted to send status information to be stored in the Device Info Database 1727 and 1784. Control is then passed to block 1803 where Device APP Recording and Transmitting Module 1772 waits for the next message.

With continued reference to FIG. 18A, as indicated by a start block 230, Server Application Module 1730 of Host Server 110 comprises a set of code adapted to start operation of Server Application Module 1730. Control is passed to block 232 where Server Application Module 1730 comprises a set of code adapted to wait for a message such as an Audio Thought File. When Host Server 110 receives a message from Internet 108 control is passed to decisional block 234 where Server Application Module 1730 comprises a set of code adapted to determine whether the message is an Audio Thought File. If the message to Host Server 110 is an Audio Thought File control is passed to block 236 where Audio Receiving Module 132 of Server Application Module 1730 comprises a set of code adapted to send the Audio Thought File to Communication Device 140. Control is then passed to block 240 where Audio Receiving Module 132 of Server Application Module 1730 comprises a set of code adapted to save the Audio Thought File in Audio Recordings Database 1726. Control is then returned to block 232 where Host Server 110 waits for another message. Returning to decisional block 234 if the message is not an Audio Thought File control is passed to decisional block 242 where Server Application Module 1730 comprises a set of code adapted to determine whether the message is a Transcribed Audio Thought File. If the message is a Transcribed Audio Thought File control is passed to block 244 where Server Application Module 1730 comprises a set of code adapted to store the Transcribed Thought File by saving it to Transcription Database 1729. Control is then returned to block 232 where Host Server 110 waits for another message. Returning to decisional block 242 if the message is not a Transcribed Audio Thought File control is then returned to block 232 where Host Server 110 waits for another message.

Referring to FIG. 18B, as indicated by a start block 210, Communication Device 140 comprises a set of code adapted to start operation of User APP Module 1750. Control is then passed to block 212 where Communication Device 140 comprises a set of code adapted to wait for a message such as an Audio Thought File. Control is passed to Decisional Block 1814 where User APP Module 1750 comprises a set of code adapted to determine whether the message is a request to add a Recording and Transmitting Device 1760. If the Message is a request to add a Recording and Transmitting Device 1760 control is passed to Add Recording and Transmitting Device Module 1758. Control is then passed to block 212 where Communication Device 140 waits for another message. Returning to decisional block 1814 if the message is not a command to add a Recording and Transmitting Device 1760 control is then passed to decisional block 214 where User APP Module 1750 comprises a set of code adapted to determine whether the message is an Audio Thought File. If the message is an Audio Thought File control is passed to block 216 where User APP Module 1750 comprises a set of code adapted to store the Audio Thought File in the Audio Recording Database 1785. Control is then passed to block 217 where User APP Module 1750 comprises a set of code to send the Audio Thought File to Transcription Module 149. Control is then passed to Transcription Module 149 where the Audio Thought File is transcribed into a Transcribed Audio Thought File. Control is then passed to block 218 where User APP Module 1750 comprises a set of code adapted to store the transcribed audio thought file in Transcription Database 1786. Control is then passed to Rules Engine Module 154 that comprises a set of code adapted to check the Transcribed Audio Thought File against all of the rules in Rule Database 148 (described in FIG. 8). Control is then passed to decisional block 220 where User APP Module 1750 comprises a set of code adapted to determine if the Transcribed Audio Thought File triggers an API Rule. If an API Rule was triggered control is passed to block 222 where User APP Module 1750 comprises a set of code adapted to send the Transcribed Audio Thought File to External Communications Server 106 to be sent to the indicated Recipient's Communication Device 192. Alternately, not shown are rules that trigger an action on Communication Device 140. This can be in the User APP Module 1750, like moving a message into a folder, or on another app, like adding to a different reminders app. Returning to block 222, control is passed to block 226 where User APP Module 1750 comprises a set of code adapted to store the Transcribed Audio Thought File by sending it through the internet 108 to Host Server 110. Control is then returned to block 212 where Communication Device 140 waits for another message. Returning to decisional block 220 if the API Rule was not triggered by the message, then control is passed to block 226 where User APP Module 1450 comprises a set of code adapted to store the Transcribed Thought File by sending it through internet 108 to Host Server 110. Control is then returned to block 212 where Communication Device 140 waits for another message.

With continued reference to FIG. 18B, returning to decisional block 214 if the message is not an Audio Thought File control is passed to decisional block 1816 where User App Module 1750 comprises a set of code to determine whether the user wants to create a new folder. If the message is a request to create a new folder control is then passed to block 1830 of Folders Module 1752 of User App Module 1750 that comprises a set of code to request a new folder name from User 118. Control is then passed to block 1832 of Folders Module 1752 of User App Module 1750 to create the new folder in Folder Database 1788. Control is then returned to block 203 where User App Module 1750 comprises a set of code adapted to wait for another message. Returning to block 1816 if the user does not want to create a new folder control is passed to decisional block 1818 where User App Module 1750 comprises a set of code to adapted to determine whether User 118 wants to select a Transcribed Audio Thought File from one folder and move it to another folder in Folder Database 1788. If the message is a request to select a Transcribed Audio Thought File from one folder and move it to another folder in Folder Database 1788, then control is passed to block 1840 where Folders Module 1752 of User App Module 1750 comprises a set of code to display a list of all folders and allow User 118 to select the Transcribed Audio Thought File from a first folder. Control is then passed to block 1842 where Folders Module 1752 of User App Module 1750 comprises a set of code to display the transcriptions in the folder that User 118 selected in block 1840 and permit User 118 to select a Transcribed Audio Thought File. Control is then passed to block 1844 where Folders Module 1752 of User App Module 1750 comprises a set of code to display the list of folders and permit the User 118 to select a folder to move the Transcribed Audio Thought File. Control is then passed to block 1846 of Folders Module 1752 of User App Module 1750 that comprises a set of code to move the Transcribed Audio Thought File to the folder selected by User 118 in block 1844. Control is then returned to block 212 where User App Module 1750 comprises a set of code adapted to wait for another message.

With continued reference to FIG. 18B, returning to block 1818 if User 118 does not want to move a Transcribed Audio Thought File from one folder to a different folder in the Folders Database 1788 control is passed to decisional block 1820 where User App Module 1750 comprises a set of code adapted to determine whether the User 118 wants to attach a media file to a Transcribed Audio Thought File. If the message is a request to attach a media file to a Transcribed Audio Thought File then control is passed to block 1850 of Media Module 1753 of User App Module 1750 that comprises a set of code to display a list of folders and allow the user to request the folder name from which to select a Transcribed Audio Thought File. Control is then passed to block 1852 of Media Module 1753 of User App Module 1750 that comprises a set of code to display the list of Transcribed Audio Thought Files in the folder that User 118 selected in block 1850 and permit the user to select a Transcribed Audio Thought File. Control is then passed to block 1854 of Media Module 1753 of User App Module 1750 that comprises a set of code to display the Transcribed Audio File chosen by User 118 and permit User 118 to edit and save the edited version. Control is then passed to block 1856 of Media Module 1753 of User App Module 1750 that comprises a set of code to display the media files of Media Database 1790 and permit the User 118 to select and attach a media file to the Transcribed Audio Thought File previously edited in block 1854. Control is then passed to block 1858 of Media Module 1753 of User App Module 1750 that comprises a set of code to send the edited Transcribed Audio File along with attached media file to the Rules Engine 154 which has previous been described. Control is then returned to decisional block 220 where User APP Module 1750 comprises a set of code adapted to determine if the Transcribed Audio Thought File triggers an API Rule. If an API Rule was triggered control is passed to block 222 where User APP Module 150 comprises a set of code adapted to send the Transcribed Audio Thought File and any associated media file to External Communications Server 106 to be sent to the indicated Recipient's Communication Device 192. Control is then passed to block 226 where User APP Module 150 comprises a set of code adapted to store the Transcribed Audio Thought File on Host Server 110 by sending it through the internet 108 to Host Server 110. Control is then returned to block 212 where Communication Device 140 waits for another message. Returning to decisional block 1820 if User 118 did not request to attach a media file to a Transcribed Audio Thought File then control is then returned to block 212 where Communication Device 1740 waits for another message.

Referring to FIG. 19, wherein the operation of Device Pairing Module 1735 of Server Application Module 1730 and Add Recording and Transmitting Device Module 1758 of User APP Module 1750 and Device Pairing Module 1774 of Recording and Transmitting Device 1760 are described.

With continued reference to FIG. 19, as indicated by a start block 1801, Device APP Recording and Transmitting Module 1772 of Recording and Transmitting Device 1770 comprises a set of code adapted to start operation of Recording and Transmitting Module 1772 by, for example, depression of button 1763. Control is passed to block 1803 where Device APP Recording and Transmitting Module 1772 comprises a set of code adapted to wait for a message such as a command to initiate recording an Audio Thought File. User 118 presses button 1763 on Recording and Transmitting Device 1770 (or voice activated) and control is passed to decisional block 1906 where Device Pairing Module 1774 comprises a set of code adapted to see if Communications Buffer 1178 already contains both valid Bluetooth® and Wi-Fi communications protocol. If the Communications Buffer 1178 already contains both valid Bluetooth® and Wi-Fi communications protocol then control is passed to block 1805. As shown by block 1805, Device APP Recording and Transmitting Module 1772 of Recording and Transmitting Device 1760 comprises a set of code adapted to record an Audio Thought File and save it to Audio Thought File Buffer 1794 as previously described in FIG. 18A. Control is then returned to block 1803 where Device App Recording and Transmitting Module 1772 of Recording and Transmitting Device 1760 waits for another message. Returning to decisional block 1906 if the Communications Buffer 1178 does not contain both valid Bluetooth® and Wi-Fi communications protocol then control is passed to block 1910 where Device Pairing Module 1774 of Recording and Transmitting Device 1760 comprises a set of code adapted to initiate Bluetooth® Device Pairing by broadcasting a Bluetooth® BLE signal. User 118 may also force Recording and Transmitting Device 1760, for example with a long press, into activation of Device Pairing Module 1774 to update settings. Returning to block 1910, control is passed to block 1912 where Device Pairing Module 1774 comprises a set of code adapted to wait for a Bluetooth® connection from Communication Device 140 and transmission of Bluetooth® and Wi-Fi communication protocol. When input occurs, control is passed to block 1914 where Device Pairing Module 1774 comprises a set of code adapted to store the Bluetooth® and Wi-Fi communication parameters passed to block 1912 in Communications Protocols Buffer 1778 on Recording and Transmitting Device 1760. Control is returned to block 1803 where Device App Recording and Transmitting Module 1772 of Recording and Transmitting Device 1760 waits for another message.

With continued reference to FIG. 19, as indicated by a start block 210, Communication Device 140 comprises a set of code adapted to start operation of User APP Module 1750. Control is then passed to block 212 where Communication Device 140 comprises a set of code adapted to wait for an input, for example, a message to Start BLE Provisioning software. When a message is received, control is passed to decisional block 1934 where Add Recording and Transmitting Device Module 1758 comprises a set of code adapted to determine if a request to Start BLE Provisioning software. If request to Start BLE Provisioning software is received, then control is passed to block 1936 where Add Recording and Transmitting Device Module 1758 comprises a set of code adapted to scan Bluetooth® to find and a Recording and Transmitting Device 1760 and connect with it using Bluetooth® BLE provisioning software. Control is passed to block 1938 where Add Recording and Transmitting Device Module 1758 comprises a set of code adapted to save the Recording and Transmitting Device 1760 and corresponding Bluetooth communication protocol to the Device Info Database 1784. Control is passed to block 1942 where Add Recording and Transmitting Device Module 1758 comprises a set of code adapted to send a message to the newly connected Recording and Transmitting Device 1760 containing WiFi and SSID credentials along with the User ID. Control is then passed to block 1944 where Add Recording and Transmitting Device Module 1758 comprises a set of code adapted to send information about Recording and Transmitting Device 1760 to the Host server 110. Control is then returned to block 212 where Communication Device 140 waits for another message. Returning to block 1934 if message is not to Start BLE provisioning software then control is passed to block 1030 where Communication Device 140 waits for another message.

With continued reference to FIG. 19, as indicated by a start block 230, Host Server 110 comprises a set of code adapted to start operation of Server Application Module 130. Control is then passed to block 232. As indicated by block 232, Host Server 110 comprises a set of code adapted to wait for input for example, New Recording and Transmitting Device information. When an input occurs, control is passed to decisional block 1926 where Add New Recording and Transmitting Device Module 1931 comprises a set of code adapted to determine if message "New Recording and Transmitting Device Info" from Communication Device 140 have been received. If message "New Recording and Transmitting Device" has been received control is passed to block 1928 where Add New Recording and Transmitting Device Module 1931 comprises a set of code adapted to save link between the Recording and Transmitting Device 1760 MAC Address and User ID from Communication Device 140 in the Device Info Database 1927. Control is then returned to block 232 where Host Server 110 waits for another message. Returning to block 1926 if the message "New Recording and Transmitting Device ID" was not received control is returned to block 232 where Host Server 110 waits for another message.

The present invention may be modified in many ways. By way of example only, Button 163 on Recording and Transmitting Device 160 may be removed and Device APP Recording and Transmitting Module 172 may be voice activated by conventional and well known means. Similarly, Button 186 on Recording and Transmitting Device 180 may be removed and Device APP Recording and Transmitting Module 187 may be voice activated by conventional and well known means. Similarly, Button 1763 on Recording and Transmitting Device 1760 may be removed and Device APP Recording and Transmitting Module 1772 may be voice activated by conventional and well known means. By way of further example, Buttons 163 and 180 and 1763 may be mechanical buttons or touchscreen buttons. By way of further example, a system permitting the Communication Device 140 to program the Recording and Transmitting Device 160, Recording and Transmitting Device 180 and/or Recording and Transmitting Device 1460 with one or more additional Wi-Fi network SSIDs and passwords. This software may also allow User 118 to delete a Wi-Fi configuration as well as editing the password on a Wi-Fi configuration. By way of further example, a system permitting the User 118 to create shared folders for storage of transcriptions (and possibly media files) which will be shared by one or more Recipient 190. User 118 and each of the specified Recipients 190 can add transcriptions files (as well as attached media files) which will be shared with every member of the Shared folder.

The system and method of the present invention provide many advantages over conventional systems and/or devices. For example, the system and method of the present invention resolves the need to write down an idea to document it. By way of further example, the system and method of the present invention increases one's ability to remember because the process is extremely fast. By way of further example, the system and method of the present invention allows users to productively work on any project or idea fractionally without the need to remember where all of the ideas are located. By way of further example, the system and method of the present invention allows users who have compromised writing ability to document and organize thoughts and ideas. By way of further example, the system and method of the present invention keeps the user in the Default Network Mode brain state by creating a frictionless outlet to document thoughts and ideas without triggering Task-positive Network brain states. By way of further example, the system and method of the present invention quickly documents difficult tasks like remembering when medicine has been administered and when/what food has been eaten. It is important not to forget information because it helps to build and maintain knowledge and skills. Forgotten information can lead to a lack of understanding and a lack of ability to apply what has been learned. Forgetting important information can lead to mistakes and errors in decision-making, and can negatively impact personal and professional life. Remembering information is crucial for problem-solving, creativity, and for making informed decisions. It also enables us to build on past experiences and knowledge, which can be useful for personal development, learning and achieving goals. It is important to remember your best ideas because they can be the foundation for future success. Best ideas often have the potential to bring about positive change, whether it be in your personal or professional life. Having a record of your ideas allows you to revisit and develop them further, leading to new insights and opportunities. Without remembering your best ideas, they can be easily lost and forgotten, which can be a missed opportunity for growth and progress. Having a collection of your best ideas can also serve as a source of inspiration and motivation. It can help you to stay focused on your goals and remind you of your potential for innovation and creativity.

The foregoing description is intended primarily for purposes of illustration. This invention may be embodied in other forms or carried out in other ways without departing from the spirit or scope of the invention. Modifications and variations still falling within the spirit or scope of the invention will be readily apparent to those of skill in the art.

What is claimed:

1. A method for remembering a thought by a person and sending the thought to a recipient having a communication device, the method comprising the steps of:
providing a Communication Device in control by the person;
providing a Recording and Transmitting Device in control by the person;
recording an audio thought by the person on the Recording and Transmitting Device to create an audio thought file;
sending the audio thought file from the Recording and Transmitting Device to the Communication Device;
transcribing the audio thought file on the Communication Device to create a transcribed audio thought file; the transcribed audio thought file comprises an Integration;
checking the transcribed audio thought file against a set of rules on the Communication Device; the set of rules comprising a Destination and first and second Integration corresponding to the Destination; the first integration being different from the second integration; and sending the transcribed thought file from the Communication Device to the Communication Device of the recipient according to the set of rules.

2. The method of claim 1, further comprising the step of providing a Host Server and wherein the step of sending the audio thought file from the Recording and Transmitting Device to the Communication Device further comprises the step of sending the audio thought file from the Recording and Transmitting Device to the Host Server and the Host Server sending the audio thought file to the Communication Device.

3. The method of claim 2, wherein the step of sending the audio thought file from the Recording and Transmitting Device to the Host Server comprises the step of sending the audio thought file from the Recording and Transmitting Device to the Host Server via WIFI.

4. The method of claim 1, wherein the step of sending the audio thought file from the Recording and Transmitting Device to the Communication Device comprises the step of sending the audio thought file from the Recording and Transmitting Device to the Communication Device via Bluetooth.

5. The method of claim 1, further comprising the step of displaying the audio thought file on the Communication Device.

6. The method of claim 1, further comprising the step of displaying the transcribed audio thought file on the Communication Device.

7. The method of claim 1, wherein the step of providing a Communication Device in control by the person comprises the step of providing a smart phone in control by the person.

8. The method of claim 1, wherein the step of providing a Host Server further comprises the step of providing an Amazon Cloud based server.

9. The method of claim 1, further comprising the steps of attaching a media file to the transcribed audio thought file and sending the transcribed thought file with the media file from the Communication Device to the Communication Device of the recipient according to the set of rules.

10. A system for remembering a thought by a person and sending the thought to a recipient having a Communication Device, the system comprising:

a Communication Device controlled by the person; said Communication Device comprising a memory device and a User APP Module stored on said memory device; said Communication Device further comprising a transcription module stored on said memory device; said User APP Module comprises a rules engine module stored on said memory device;

a Recording and Transmitting Device controlled by the person; said Recording and Transmitting Device comprising a memory device and a Device APP Recording and Transmitting Module stored on said memory device; said Device APP Recording and Transmitting Module is adapted to record an audio thought file by the person that is stored on said memory device of said Recording and Transmitting Device; said Device APP Recording and Transmitting Module is further adapted to send said audio thought file to said Communication Device;

said transcription module of said Communication Device is adapted to transcribe said audio thought file to create a transcribed audio thought file; said transcribed audio thought file comprises an Integration; said rules engine module of said User APP Module is adapted to check said transcribed audio thought file against a set of rules; said set of rules comprising a Destination and a First Integration and a Second Integration corresponding to the Destination; said First Integration being different from said Second Integration; said rules engine module of said User APP Module is further adapted to send said transcribed thought file to the Communication Device of the recipient according to said set of rules.

11. The system of claim 10, further comprising a Host Server comprising a memory device and a Server Application Module stored on said memory device; said Device APP Recording and Transmitting Module is adapted to send said audio thought file to said Host Server and said Server Application Module of said Host Server is adapted to send said audio thought file to said Communication Device.

12. The system of claim 11, wherein said Device APP Recording and Transmitting Module of said Recording and Transmitting Device is adapted to send said audio thought file to said Host Server via WIFI.

13. The system of claim 10, wherein said Device APP Recording and Transmitting Module of said Recording and Transmitting Device is adapted to send said audio thought file to said Communication Device via Bluetooth.

14. The system of claim 10, wherein said Communication Device further comprises a display screen; said User APP Module is adapted to display said audio thought file on said display screen of said Communication Device.

15. The system of claim 14, wherein said User APP Module is adapted to display said transcribed audio thought file on said display screen of said Communication Device.

16. The system of claim 15, wherein said Recording and Transmitting Device further comprises a button; activation of said button causes activation of said Device APP Recording and Transmitting Module.

17. The system of claim 16, wherein said User APP Module further comprises a Media Module adapted to allow the person to attach a media file stored on the memory device of the Communication Device to said transcribed audio file.

* * * * *